US009832283B2

(12) United States Patent
Godfrey et al.

(10) Patent No.: US 9,832,283 B2
(45) Date of Patent: *Nov. 28, 2017

(54) FACILITATING QUALITY OF SERVICE AND SECURITY VIA FUNCTIONAL CLASSIFICATION OF DEVICES IN NETWORKS

(71) Applicant: AT&T Intellectual Property I, L.P., Atlanta, GA (US)

(72) Inventors: Jason Godfrey, Volcano, CA (US); Jennifer Morovitz, Ballwin, MO (US); Toby Bearden, McKinney, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/359,956

(22) Filed: Nov. 23, 2016

(65) Prior Publication Data

US 2017/0078440 A1  Mar. 16, 2017

Related U.S. Application Data

(63) Continuation of application No. 14/512,029, filed on Oct. 10, 2014, now Pat. No. 9,544,395.

(51) Int. Cl.
*H04L 29/08* (2006.01)
*G06F 11/07* (2006.01)
(Continued)

(52) U.S. Cl.
CPC .......... *H04L 67/322* (2013.01); *G06F 11/079* (2013.01); *G06F 11/0709* (2013.01);
(Continued)

(58) Field of Classification Search
CPC ............... H04L 41/0853; H04L 67/322; G06F 11/0709; G06F 11/079; H04W 4/005
See application file for complete search history.

(56) References Cited

U.S. PATENT DOCUMENTS 7,499,972 B1  3/2009 Buonanno et al.
8,495,377 B2  7/2013 Haddad et al.
(Continued)

FOREIGN PATENT DOCUMENTS

EP  2512106 A1  10/2012
GB  2487459 A  7/2012
(Continued)

OTHER PUBLICATIONS

"Machine-to-Machine Communications (M2M); Functional Architecture," ETSI TS 102 690, Technical Specification, 2011, 280 Pages, V1.1.1., European Telecommunications Standards Institute, France.
(Continued)

*Primary Examiner* — Kim T Nguyen
(74) *Attorney, Agent, or Firm* — Amin, Turocy & Watson, LLP

(57) ABSTRACT

Quality of service and security are facilitated via functional classification of devices within a network. One method includes receiving, by a first device, notification information of a presence of a second device among the devices of the network, wherein the devices are configured to communicate information about events associated with respective operations of the devices; and generating, by the first device, first information indicative of an identity of and a functional classification of a function of the second device. The method also includes initiating, by the first device to a controller within the network, a transmission of second information for association of third information indicative of the functional classification of the function of the second device with fourth information generated by the second device. The functional classification of the function of the second device is associated with potential impact of failure of the second device.

20 Claims, 21 Drawing Sheets

(51) Int. Cl.
*H04L 12/24* (2006.01)
*H04W 4/00* (2009.01)

(52) U.S. Cl.
CPC ...... *G06F 11/0739* (2013.01); *G06F 11/0793* (2013.01); *H04L 41/0853* (2013.01); *H04W 4/005* (2013.01)

(56) References Cited

U.S. PATENT DOCUMENTS

| | | | |
|---|---|---|---|
| 8,531,986 | B2 | 9/2013 | Raleigh |
| 8,533,803 | B2 | 9/2013 | Cha et al. |
| 8,737,989 | B2 | 5/2014 | Luft |
| 2009/0031603 | A1 | 2/2009 | Kitchen et al. |
| 2010/0142538 | A1 | 6/2010 | Glover et al. |
| 2011/0016321 | A1 | 1/2011 | Sundaram et al. |
| 2011/0035287 | A1 | 2/2011 | Fox |
| 2011/0201307 | A1 | 8/2011 | Segura |
| 2011/0213871 | A1 | 9/2011 | DiGirolamo et al. |
| 2011/0265158 | A1 | 10/2011 | Cha et al. |
| 2012/0047558 | A1 | 2/2012 | Sundaram et al. |
| 2012/0096513 | A1* | 4/2012 | Raleigh ............ H04W 24/10 726/1 |
| 2012/0117140 | A1 | 5/2012 | Wang et al. |
| 2012/0159167 | A1 | 6/2012 | Lee et al. |
| 2012/0198520 | A1 | 8/2012 | Cha et al. |
| 2012/0203894 | A1 | 8/2012 | Lee et al. |
| 2012/0284777 | A1 | 11/2012 | Eugenio et al. |
| 2012/0287854 | A1 | 11/2012 | Xie et al. |
| 2012/0290702 | A1 | 11/2012 | Vincent |
| 2013/0016657 | A1 | 1/2013 | Muhanna et al. |
| 2013/0040678 | A1 | 2/2013 | Lee et al. |
| 2013/0045710 | A1 | 2/2013 | Raleigh |
| 2013/0046841 | A1 | 2/2013 | Park et al. |
| 2013/0053084 | A1 | 2/2013 | Cho et al. |
| 2013/0066965 | A1 | 3/2013 | Foti |
| 2013/0077579 | A1 | 3/2013 | Cho et al. |
| 2013/0142118 | A1 | 6/2013 | Cherian et al. |
| 2013/0176907 | A1 | 7/2013 | Foti |
| 2013/0212236 | A1 | 8/2013 | Foti et al. |
| 2013/0242848 | A1 | 9/2013 | Kim et al. |
| 2013/0252643 | A1 | 9/2013 | Park et al. |
| 2013/0258953 | A1 | 10/2013 | Huang et al. |
| 2013/0339438 | A1 | 12/2013 | Cherian et al. |
| 2014/0010140 | A1 | 1/2014 | Martinez et al. |
| 2014/0105009 | A1* | 4/2014 | Vos ............ H04W 28/0268 370/230 |
| 2014/0310398 | A1* | 10/2014 | Zhou ............ H04L 43/08 709/224 |

FOREIGN PATENT DOCUMENTS

| | | |
|---|---|---|
| JP | 2014007668 A | 1/2014 |
| WO | 2005043262 A2 | 5/2005 |
| WO | 2009092115 A2 | 7/2009 |
| WO | 2011030294 A2 | 3/2011 |
| WO | 2011101032 A1 | 8/2011 |
| WO | 2012018824 A1 | 2/2012 |
| WO | 2012141557 A2 | 10/2012 |
| WO | 2013078408 A1 | 5/2013 |
| WO | 2014053197 A1 | 4/2014 |

OTHER PUBLICATIONS

Zheng et al., "Radio Resource Allocation in LTE-Advanced Cellular Networks with M2M Communications," Communications Magazine, Jul. 2012, pp. 184-192, IEEE.
Ren et al., "RISE: A Rellable and Secure Scheme for Wireless Machine to Machine Communications," Tsinghua Science and Technology, Feb. 2013, pp. 100-107, vol. 18, Issue 1.
Morovitz, "M2M Security Framework," AT&T Cyber Security Conference, Sep. 10, 2013, 12 Pages, At&T Intellectual Property.
Chen et al., "A Survey of Recent Developments in Home M2M Networks," IEEE Communications Surveys & Tutorials, 2014, pp. 98-114, vol. 16, Issue 1.
Dungen et al., "Towards a Simple, Versatile, Distributed Low-Power Wireless M2M Infrastructure," 1st IEEE International Workshop on Machine to Machine Communications Interfaces and Platforms, 2013, pp. 890-895, IEEE, Montreal, Quebec, Canada.
Marjamaa, "A Measurement-Based Analysis of Machine-To-Machine Communications Over a Cellular Network," Jan. 6, 2012, 97 Pages, Helsinki, Finland.
Zhang et al., "Home M2M Networks: Architectures, Standards, and QoS Improvement," IEEE Communications Magazine, Apr. 2011, pp. 44-52, IEEE.
Rost et al., "Cloud Technologies for Flexible 5G Radio Access Networks," IEEE Communications Magazine, May 2014, pp. 68-76, IEEE.
Wu et al., "M2M: From Mobile to Embedded Internet," IEEE Communications Magazine, Apr. 2011, pp. 36-43, IEEE.
Emmerson, "M2M: The Internet of 50 Billion Devices," Win-Win Magazine, Jan. 2010, pp. 19-22.
Lelah et al., "SensCity: A New Project Opening the Way for Sustainable Services in the City Based on a Mutualised M2M Infrastructure," CIRP IPS2 Conference, Apr. 30, 2010, 9 Pages, Linkoping, Sweden.
Watson et al., "Machine to Machine (M2M) Technology in Demand Responsive Commercial Buildings," Proceedings from the ACEEE Summer Study on Energy Efficiency in Buildings: Breaking out of the Box, Aug. 2004, 18 Pages, Pacific Grove, California.
Notice of Allowance dated Aug. 25, 2016 for U.S. Appl. No. 14/512,029, 25 pages.

* cited by examiner

FACILITATING QUALITY OF SERVICE AND SECURITY VIA FUNCTIONAL CLASSIFICATION OF DEVICES IN NETWORKS

CROSS-REFERENCE TO RELATED APPLICATION

This patent application is a continuation of, and claims priority to, U.S. patent application Ser. No. 14/512,029 (now U.S. Pat. No. 9,544,395), filed on Oct. 10, 2014, and entitled "FACILITATING QUALITY OF SERVICE AND SECURITY VIA FUNCTIONAL CLASSIFICATION OF DEVICES IN NETWORKS". The entirety of the foregoing application is hereby incorporated by reference herein.

TECHNICAL FIELD

The subject disclosure relates generally to communication networks, and specifically to facilitating quality of service (QoS) and security via functional classification of devices in networks.

DETAILED DESCRIPTION

Figure 1:
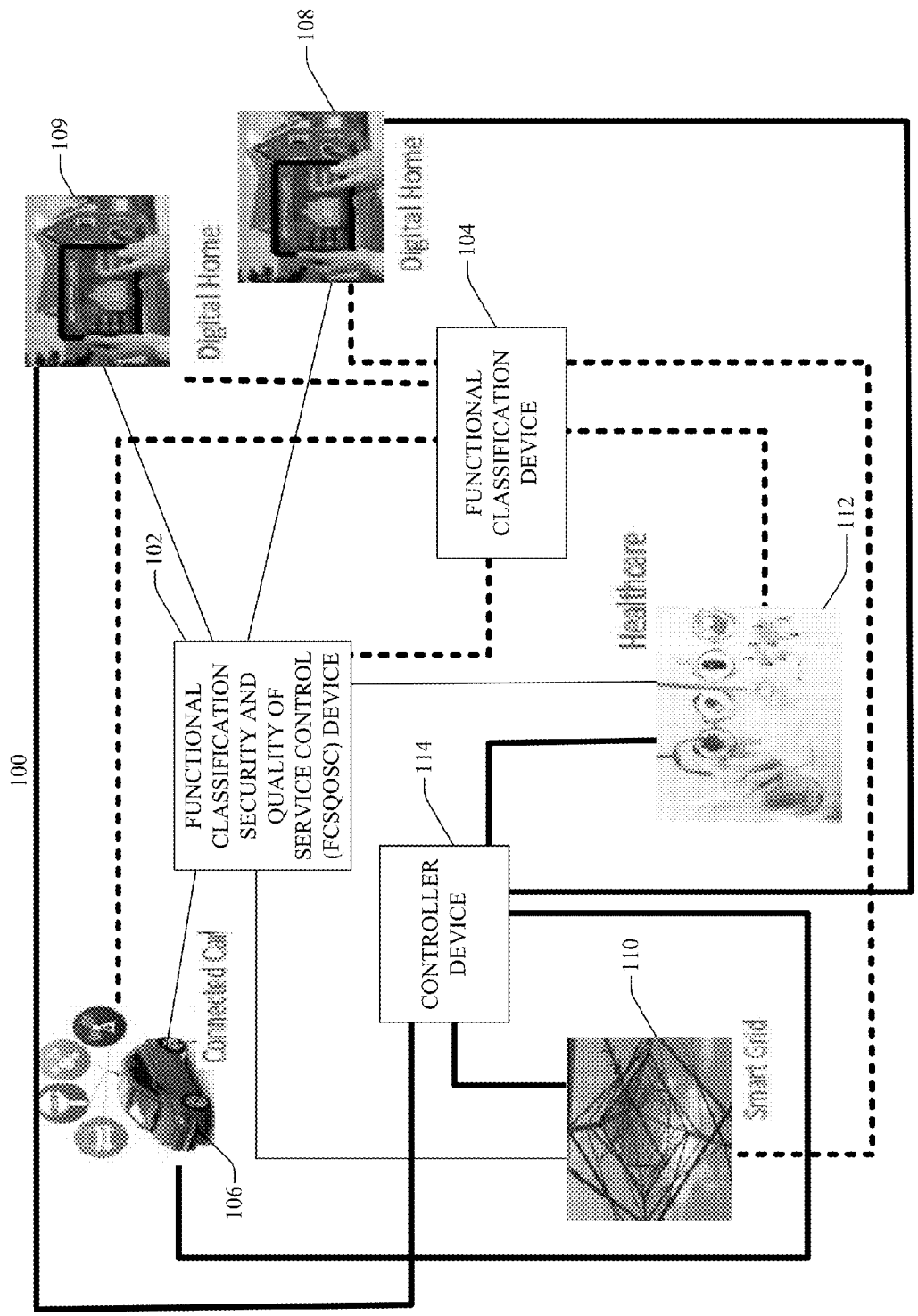
FIG. 1 illustrates an example block diagram of a system in which QoS and security via functional classification of devices in M2M networks can be facilitated in accordance with one or more embodiments.

One or more embodiments are described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "mobile device," "subscriber," "customer," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

The convergence of developments for machine technology and communications has given rise to M2M networks in which wireless and wired systems are employed to provide communication between devices, or machines, of the same type or of different types. As used herein, the term "machine-to-machine," or "M2M" can mean a network in which devices are configured to communicate information about events associated with respective operations of the devices. For example, a device may communicate information about whether the device has detected an open door, whether heart activity is normal, whether water has been sensed, the temperature in an environment or the like. M2M networks are found across many domains (e.g., smart power grids, vehicular telematics, information management, medical/health services, digital home). In many M2M networks, unique security challenges abound based on the combination of devices having an array of inexpensive sensors and the different types of communication allowed in these environments. For example, the use of sensors, mobile communications, wireless communications, short-range networks and/or gateways as enablers to M2M applications and networks presents unique security challenges.

Systems and methods are needed for assessing overall M2M network security; identifying and/or applying selected security and/or QoS controls and the same to improve the likelihood that important data generated by selected devices continues to be available and/or accessible and/or reliable during times of network saturation (e.g., post-natural disaster).

Embodiments described herein include systems, methods, apparatus and/or computer-readable storage media facilitating QoS and security via functional classification of devices in M2M networks. In one embodiment, a method includes: receiving, by a first device of devices of a network, and the first device including a processor, notification information of a presence of a second device among the devices of the network, wherein the devices are configured to communicate information about events associated with respective operations of the devices. The method also includes: generating, by the first device, first information indicative of an identity of the second device and a functional classification associated with a function of the second device; and initiating, by the first device to a controller device within the network, a transmission of second information for association of third information indicative of the functional classification of the function of the second device with data generated by the second device.

In another embodiment, an apparatus is provided. The apparatus includes: a processor; and a memory that stores executable instructions that, when executed by the processor, facilitate performance of operations. The operations include determining logic information associated with a function of a device of a network, wherein the device is configured to communicate information about events associated with respective operations of the device; determining a potential impact of failure of the device to perform the function; and determining security control information for the device based on the logic information and the potential impact of the failure.

In another embodiment, an apparatus includes: a processor; and a memory that stores executable instructions that, when executed by the processor, facilitate performance of operations. The operations include receiving notification information of a presence of a device among devices within a network, wherein the devices are configured to communicate information about events associated with respective operations of the devices. The operations can also include receiving first information indicative of an identity of the device and a functional classification of a function of the device. The operations can also include initiating, to a controller device within the network, a transmission of second information for association of third information indicative of the functional classification of the function of the device with data generated by the device.

FIG. 1 illustrates an example block diagram of a system in which QoS and security via functional classification of devices in M2M networks can be facilitated in accordance with one or more embodiments. In various embodiments, as described in greater detail below, system 100 can be employed to facilitate assessment of the overall M2M network security; identify applicable security controls; and/or dynamically apply security controls and network QoS to assure that functions that are of a higher functional classification (e.g., life safety or critical functional classification) receive the protection and/or QoS to improve the likelihood that data generated in connection with these functions will be available and/or accessible notwithstanding network saturation that may occur (such as during times of natural disaster). During periods of network resource saturation (e.g., post-natural disaster), there is a need to provide network resource priority to M2M devices that have a higher functional classification (e.g., life safety functional classification) then those that are less sensitive. A solution is to identify the functional classifications of the devices in the networks by applying the M2M security framework taking into account business logic, device data and potential impact of failure of the function of the device. Functional classifications can include, but are not limited to, non-sensitive, sensitive, critical and life safety. In embodiments, system 100 can employ functional classification to automatically deploy appropriate levels of security controls and/or QoS throughout the network by annotating data generated by particular devices with associated functional classifications. The functional classifications then are used to determine the appropriate level of security control and/or QoS with which to handle the data from the devices.

Figure 2:
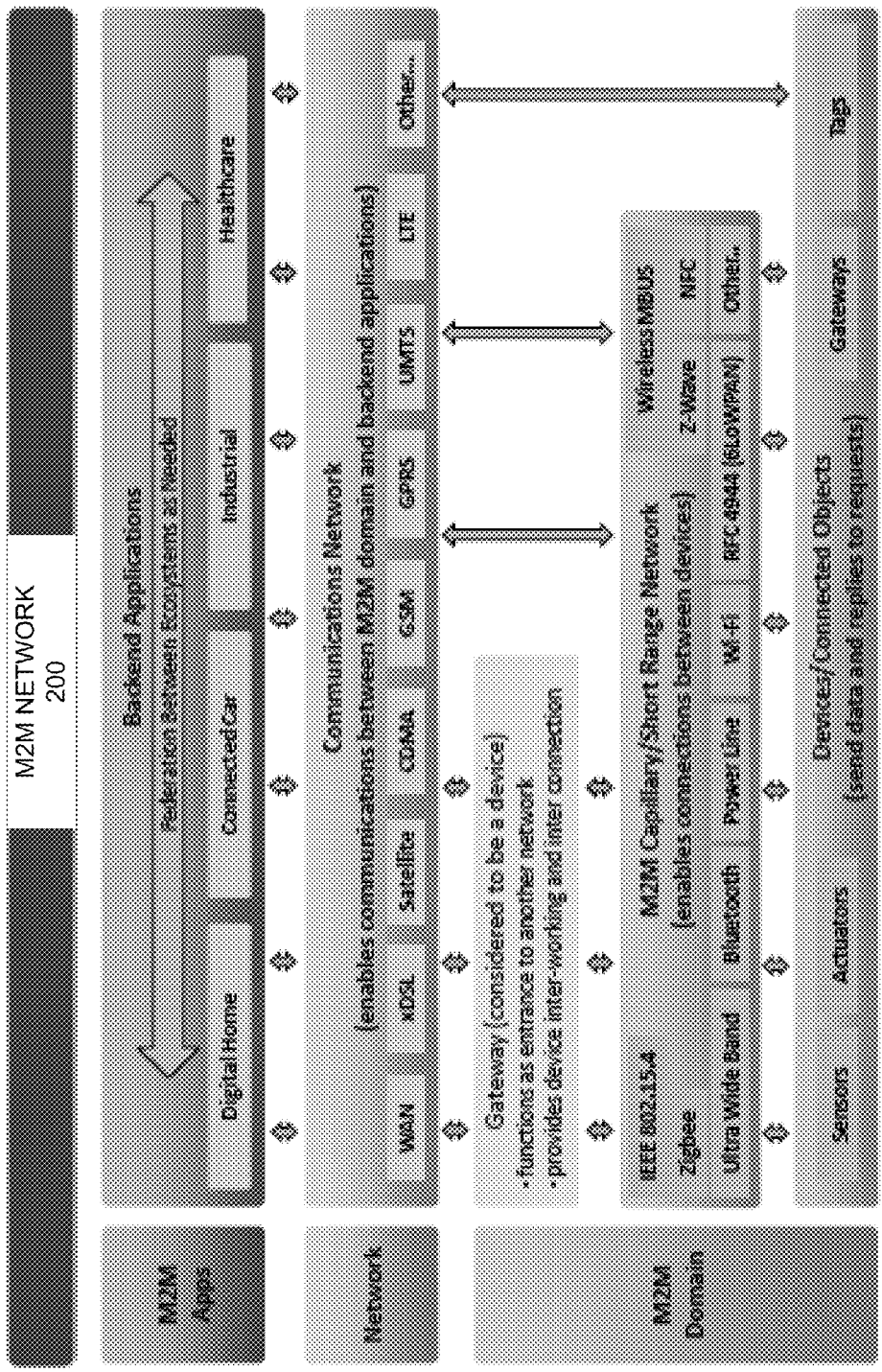
FIG. 2 illustrates an example diagram of aspects of the M2M network of FIG. 1 in accordance with one or more embodiments described herein.

FIG. 2 illustrates an example diagram of aspects of the M2M network of FIG. 1 in accordance with one or more embodiments described herein. An example M2M network 200 is shown. M2M network 200 can include many different domains (e.g., smart power grid, vehicular telematics, information management, medical/health services, digital home), facilitate different applications (e.g., digital home application, connected car application, industrial applications, healthcare applications), and/or include numerous different communications networks (e.g., GSM, CDMA, LTE, satellite networks) and/or M2M domains (short range networks and/or connected devices (e.g., sensors, actuators). As such, devices in M2M network 200 can operate in any of the domains or communications networks and/or perform any number of different operations according to any of the applications shown in FIG. 2. With reference to FIG. 1, devices 106, 108, 109, 110, 112, controller device 114 and/or FCSQOSC device 102 can be included in M2M network 200. In some embodiments, functional classification device 104 can also be included in M2M network 200.

Turning back to FIG. 1, system 100 includes FCSQOSC device 102, functional classification device 104, devices 106, 108, 109. 110, 112 and/or controller device 114. In various embodiments, one or more of FCSQOSC device 102, functional classification device 104, devices 106, 108, 109. 110, 112 and/or controller device 114 can be electrically and/or communicatively coupled to one another to perform one or more functions of system 100. While, in the embodiment shown, functional classification device 104 is included in system 100, functional classification device 104 need not be included in the M2M network in which FCSQOSC device 102, controller device 114 and/or one or more of devices 106, 108, 109, 110, 112 are within. By contrast, in some embodiments, functional classification device 104 can be communicatively coupled to one or more of devices 106, 108, 109, 110, 112 and/or FCSQOSC device 102 while being associated with a network other than an M2M network.

Turning first to the devices in system 100, devices 106, 108, 109. 110, 112 can be any number of different types configured to transmit and/or receive information within an M2M network. By way of example, but not limitation, device 106 can be a connected car device providing connectivity between one or more connected cars; devices 108, 109 can be digital home devices providing sensing, monitoring, home security, appliance control, temperature control and/or lighting control; device 110 can be a smart grid device that can monitor and/or control a smart grid or component of a smart grid; and/or device 112 can be a healthcare device (e.g., defibrillator) that can provide healthcare treatment to a patient or other entity. As such, devices 106, 108, 109, 110, 112 can be sensors, actuators, thermostats, electronic switches, cameras, fault detection devices, estimation devices or the like. Any number of devices that can be electrically coupled (via wireless channel or wired channel) to system 100 and/or that can otherwise receive inputs and/or provide outputs associated with operation of the devices or other components being monitored by the devices can be or be a part of devices 106, 108, 109, 110, 112.

FCSQOSC device 102 can be a control device that includes a repository for information about devices 106, 108, 109, 110, 112. For example, FCSQOSC device 102 can store a table or other database that includes the identity of one or more of devices 106, 108, 109, 110, 112 and corresponding functional classifications for the particular device for which the identity is stored. In some embodiments, FCSQOSC device 102 can also determine security control information and/or QoS control information such as specific security and/or QoS protocols for treatment of data generated by one or more of devices 106, 108, 109, 110, 112. By way of example, but not limitation, security control information can include an indicator of a particular security protocol to apply to data generated by a particular device. For example, the security protocol can indicate that encryption (or a first type of encryption) is to be applied to data from a first one of devices 106, 108, 109, 110, 112 while no encryption (or a second type of encryption) is to be applied to data from a second one of devices 106, 108, 109, 110, 112. The different types of encryption can be associated with different resultant security levels and/or with complexity in decryption, for example. As such, the level of security that FCSQOSC device 102 determined should be applied to data of a particular device varies from device to device. Similarly, the QoS control information can be indicative of factors such as a desired maximum latency, minimum throughput, maximum bit error rate and/or whether forward error correction is to be employed for data generated by a device.

In some embodiments, controller device 114 can receive security control information and/or QoS control information from FCSQOSC device 102. In some embodiments, controller device 114 can access the security control information and/or QoS control information albeit such information may not be transmitted from FCSQOSC device 102. For example, the security control information and/or the QoS control information can be stored at FCSQOSC device 102 and accessed by controller device 114. As another example, FCSQOSC device 102 can store security control information and/or QoS control information at a repository accessible by controller device 114 at a location other than FCSQOSC device 102. In some embodiments, FCSQOSC device 102 transmits or provides access to controller device 114 of the identity and/or functional classification of one or more of devices 106, 108, 109, 110, 112. Controller device 114 can then determine security control information and/or QoS control information for the devices for which controller device 114 received and/or accessed identity and/or functional classification information about one or more of devices 106, 108, 109, 110, 112. In various embodiments, either of FCSQOSC device 102 and/or controller device 114 can determine one or more of security control information and/or QoS control information for one or more of devices 106, 108, 109, 110, 112.

In the embodiments described herein, the security control information and/or the QoS control information determination is based on the functional classification assigned to a particular one of devices 106, 108, 109, 110, 112. Functional classification device 104 can determine and assign the functional classification for each (or, in other embodiments, one or more) of devices 106, 108, 109, 110, 112 based on a number of different factors. For example, in one embodiment, functional classification device 104 can determine a functional classification for any one of devices 106, 108, 109, 110, 112 based on business logic indicative of the operation of one or more of devices 106, 108, 109, 110, 112, based on data generated by one or more of 106, 108, 109, 110, 112 and/or based on the level of criticality of the potential impact to a physical environment if there is a failure of one or more of devices 106, 108, 109, 110, 112 to perform the function of the device. For example, if the potential impact to the physical environment is a threat to life safety, the functional classification device 104 assigns a higher functional classification for the device than if the potential impact to the physical environment is a threat to property.

Embodiments of structure and/or functionality of devices 106, 108, 109, 110, 112, FCSQOSC device 102, functional classification device 104 and controller device 114 along with system 100 will be described in greater detail with reference to FIGS. 3-14. Repetitive description of like elements employed in other embodiments described herein is omitted for sake of brevity.

Figure 3:
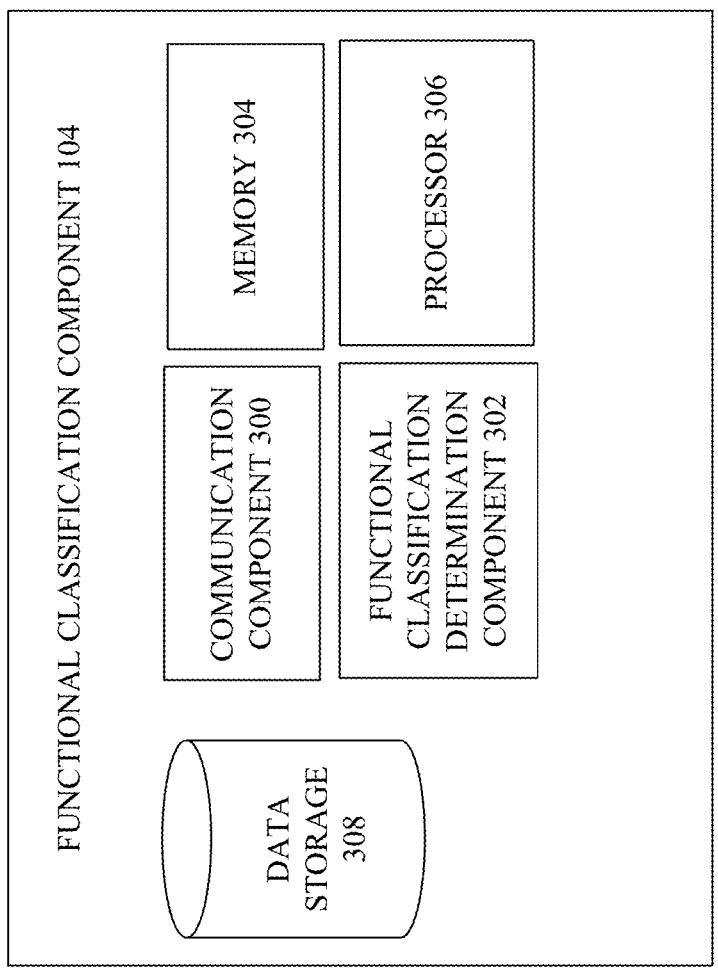
FIG. 3 illustrates an example block diagram of the functional classification component of FIG. 1 that can facilitate QoS and security via functional classification of devices in M2M networks in accordance with one or more embodiments.

FIG. 3 illustrates an example block diagram of the functional classification component of FIG. 1 that can facilitate QoS and security via functional classification of devices in M2M networks in accordance with one or more embodiments. As shown, functional classification component 104 can include communication component 300, functional classification determination component 302, memory 304, processor 306 and/or data storage 308. In some embodiments, one or more of communication component 300, functional classification determination component 302, memory 304, processor 306 and/or data storage 308 can be electrically and/or communicatively coupled to one another to perform one or more functions of functional classification component 104.

Communication component 300 can transmit and/or receive information about and/or for determining functional classifications of one or more devices (e.g., one or more of devices 106, 108, 109, 110, 112). For example, in one embodiment, communication component 300 can receive business logic information from one or more devices that describes inputs to the device, outputs from the device and/or the functionality of the device. The functionality of the device can include, but is not limited to, the operation performed by the device (e.g., sensing a water plant, detecting whether a door is opened, measuring the temperature in an environment) and/or the operation performed by the device in response to information detected about the environment (e.g., generate and transmit a message informing a security system that a door has been opened for longer than the authorized time, generate and transmit a message informing a fault detection system that water leakage is detected at a power plant, generate and transmit a message to a heating ventilation and air conditioning control system that a temperature in a monitored environment has exceeded the authorized temperature and to initiate cooling of the environment). Any number of different functions of the device can be described as business logic.

Communication component 300 can also receive information indicative of device data generated by or otherwise transmitted from the device. Communication component 300 can also receive information indicative of the potential impact of failure of a device to perform one or more of the functions identified via the business logic of the device.

In various embodiments, communication component 300 can transmit functional classification information to a device and/or FCSQOSC device 102 in a network in which the device is located.

Functional classification determination component 302 can determine and/or assign a functional classification for one or more devices in an M2M network. For example, with reference to FIGS. 1 and 3, functional classification determination component 302 can assign a functional classification to each (or one or more) of devices 106, 108, 109. 110, 112. In some embodiments, the functional classification can be based on a combination of the business logic describing the function/operation of the device, the data generated by the device and the potential impact of failure of the device to perform the function. Because devices of the same type can perform different functions, functional classification determination component 302 can evaluate the specific function performed by the device as opposed to the type of the device itself in order to determine the functional classification.

Figure 4:
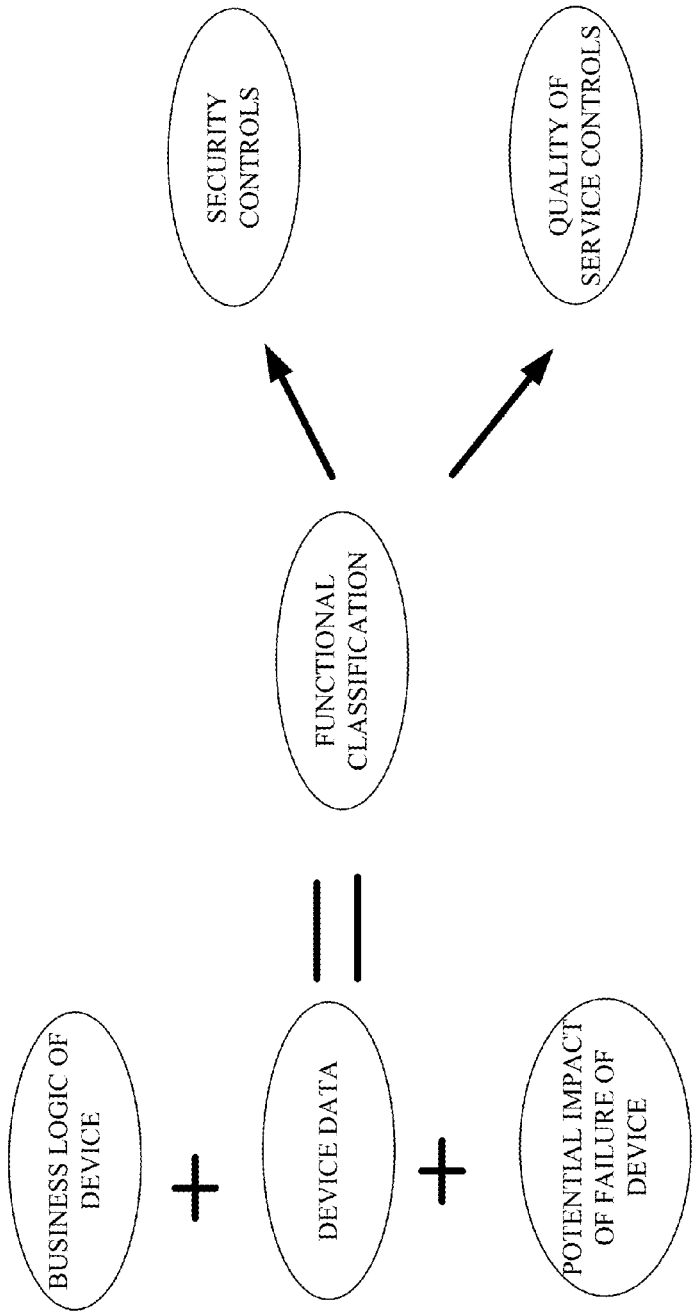
FIG. 4 illustrates an example diagram of a functional classification process performed by the functional classification device of FIG. 3 for a device in accordance with one or more embodiments.

FIG. 4 illustrates an example diagram of a functional classification process performed by the functional classification device of FIG. 3 for a device in accordance with one or more embodiments. To identify a functional classification for a device, functional classification determination device 302 can evaluate a number of factors. As shown in FIG. 4, functional classification device can employ a process that evaluates a combination of business logic associated with a device, device data generated by the device and potential impact of failure of the device to determine a functional classification for the device. As shown, functional classification determination device 302 can combine the three types of information (e.g., business logic information, device data information and potential impact information) to determine an overall functional classification for the device in some embodiments. In other embodiments, functional classification determination device 302 can select any of the three types of information (or any combination of two types of information) and determine a functional classification for the corresponding device based on the evaluated information.

In some embodiments, functional classification determination device 302 can weigh each of the three factors equally. In other embodiments, functional classification determination device 302 can weigh different factors differently. For example, potential impact of failure of the device can be associated with a larger weight than device data. Any number of configurations is possible and functional classification determination device 302 can be programmed and/or re-programmed or configured to generate different weightings from time to time. The functional classification can be employed by FCSQOSC device 102 and/or controller device 114 to perform security control and/or QoS control for the device for which the functional classification is generated.

With reference to FIGS. 1 and 4, In one embodiment, functional classification device 104 can receive and/or determine each of (or, in some embodiments, one or more of) business logic information, device data information and/or potential impact of device failure for devices 106, 108, 109. 110, 112 to determine the functional classifications of devices 106, 108, 109. 110, 112. In some embodiments, business logic information can include, but is not limited to, rules that define particular actions to be performed by devices 106, 108, 109, 110, 112. In some embodiments, business logic information can include one or more rules regarding how a device functions based on another device. For example, business logic can include a rule that indicates that if a door opens, a light is turned on. In this scenario, a first device can monitor the door and trigger a second device to activate a light switch based on the first device detecting that the door has opened. The set of rules that describe how a device operates (e.g., when a first defined event happens, device A causes a second defined event to happen OR when a first defined event happens, device A transmits a signal or other information to alert a device B to perform a function) can be the business logic information for a particular device.

Device data information can include, but is not limited to, inputs to and/or outputs from devices 106, 108, 109, 110, 112. For example, device data can be an indicator that a fault has been detected. As another example, device data can be an indicator of a particular numerical value of a temperature detected in a monitored area. In some embodiments, the device data can include or be information indicative of the status of a component (e.g., a component monitored or controlled by a device). For example, the status can be that a door is open or closed.

Potential impact of failure of the device includes information indicative of the potential impact to the physical area in which the device is located, or the physical area with which the device is associated, if the function of the device is not performed or is not performed properly. In some embodiments, the device is located in the area in which the device is associated (e.g., a water sensor located in an area in which water leakage may occur). In other embodiments, the device is located in a first area while the area associated with the device is a second area distinct from the first area (e.g., a device at a control center that receives notification from the water sensor of the previous example and shuts off a main water valve OR a device that transmits a signal to a user when unauthorized activity is detected by a camera in a home environment). As such, the devices described herein as devices 106, 108, 109, 110, 112 can be located within a physical region being monitored or can be located in a region distinct from a region being monitored or controlled by another device.

In some embodiments, potential impact of failure includes information indicative of the potential impact if the device is manipulated such that the function is not performed and/or is not performed properly. However, potential impact of failure can also include the potential impact of failure or improper operation caused by any number of reasons including, but not limited to, expiration of life of the device, device fault or malfunction or the like. As shown in FIG. 4, the functional classification can be employed to determine security controls and/or QoS controls for a particular device. For example, FCSQOSC device 102 and/or controller device 114 can assign security control information and/or QoS control information to a device based on the functional classification assigned by functional classification component 104. By way of example, but not limitation, a defined maximum bit error rate, maximum latency and/or minimum throughput can be associated with data generated by a device. The particular defined maximum bit error rate, maximum latency and/or minimum throughput selected can be a function of the functional classification determined for the device.

Figure 5:
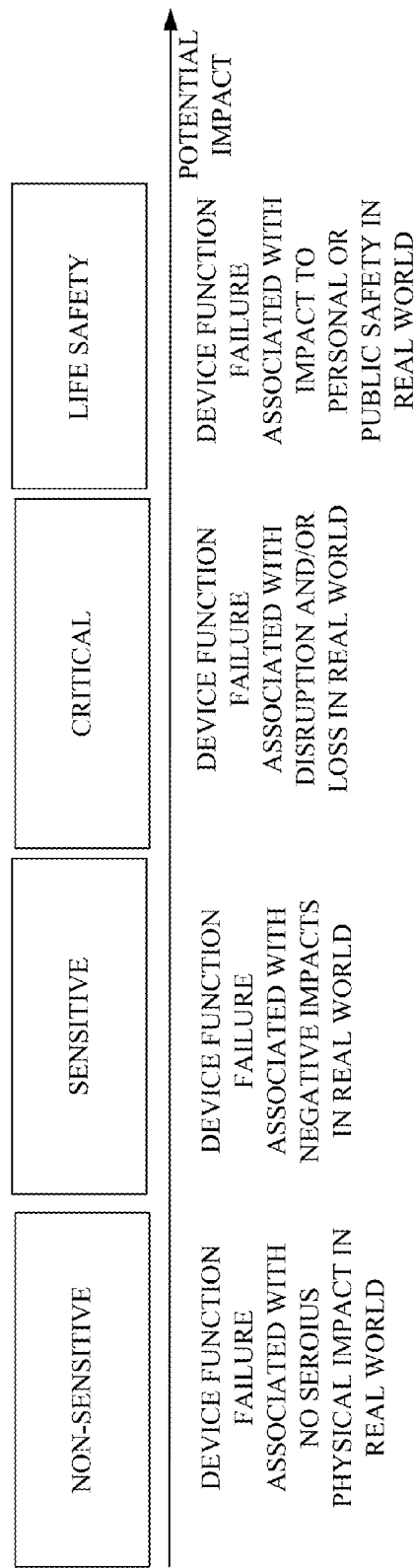
FIG. 5 illustrates an example diagram of functional classification levels assigned by the functional classification device of FIG. 3 and corresponding potential impacts of failure of the functions of devices in accordance with one or more embodiments described herein.

FIG. 5 illustrates an example diagram of functional classification levels assigned by the functional classification device of FIG. 3 and corresponding potential impacts of failure of the functions of devices in accordance with one or more embodiments described herein. The level of criticality of the potential impact of failure can vary by device. As such, the functional classification is indicative of the specific impact of failure for the specific device. In this regard, notwithstanding two devices may have the same function, the environments in which the functions are performed could lead to drastically different results should the device have a malfunction and not perform its function (and do so properly).

As shown in FIG. 5, the functional classification assigned to a device can be non-sensitive, sensitive, critical or life safety. The functional classifications can exist on a spectrum with non-sensitive being the least serious functional classification (and therefore receiving the lowest level of security and/or QoS) and with life safety being the most serious functional classification (and therefore receiving the highest level of security and/or QoS). Any number of other functional classifications can be added from time to time as device functionality evolves.

In one example, a device can be classified as non-sensitive device for devices in which function failure is associated with no serious physical impact to the physical environment that the device is monitoring and/or in which the device is located. Cases of minor inconvenience with malfunction can be associated with the non-sensitive functional classification. An example would be classification of a sensor that should generate a signal if there is mail in a mailbox.

In another embodiment, failure of a function to occur can be associated with negative impacts in the real world monitored by the device and/or in which the device is located. For example, failure of a switch that should turn on a room light when a room door opens during a time that is associated with non-daylight hours can be classified as a sensitive device.

In another embodiment, failure of a function to occur can be associated with loss or disruption within the physical environment in which the device is located. By way of example, but not limitation, the device can be a thermostat or water sensor and if the sensor detects a water leak, the business logic can indicate that the functionality of the water sensor is to shut off the main valve. If the water sensor main valve shut off function did not operate properly (e.g., if the message to shut off the main valve was not sent by the water sensor), there would be property damage and loss caused by the leaking water. In this case in which a device that fails to function according to the business logic causes loss and/or damage, the functional classification for such function is critical. Another example would be a sensor that fails to generate an alarm in the case of property invasion.

In another embodiment, if failure of a device to perform according to the business logic for the device leads to personal or public safety risk, the functional classification for the device can be the life safety functional classification. For example, if a defibrillator had business logic that indicated the defibrillator was to activate upon detection of a particular pattern of heart activity, and failed to do so, the human served by the defibrillator would have risk to personal health. As such, the function served by the defibrillator of outputting shock waves to cause heart activity or to regulate heart activity is within the life safety functional classification.

Figure 6:
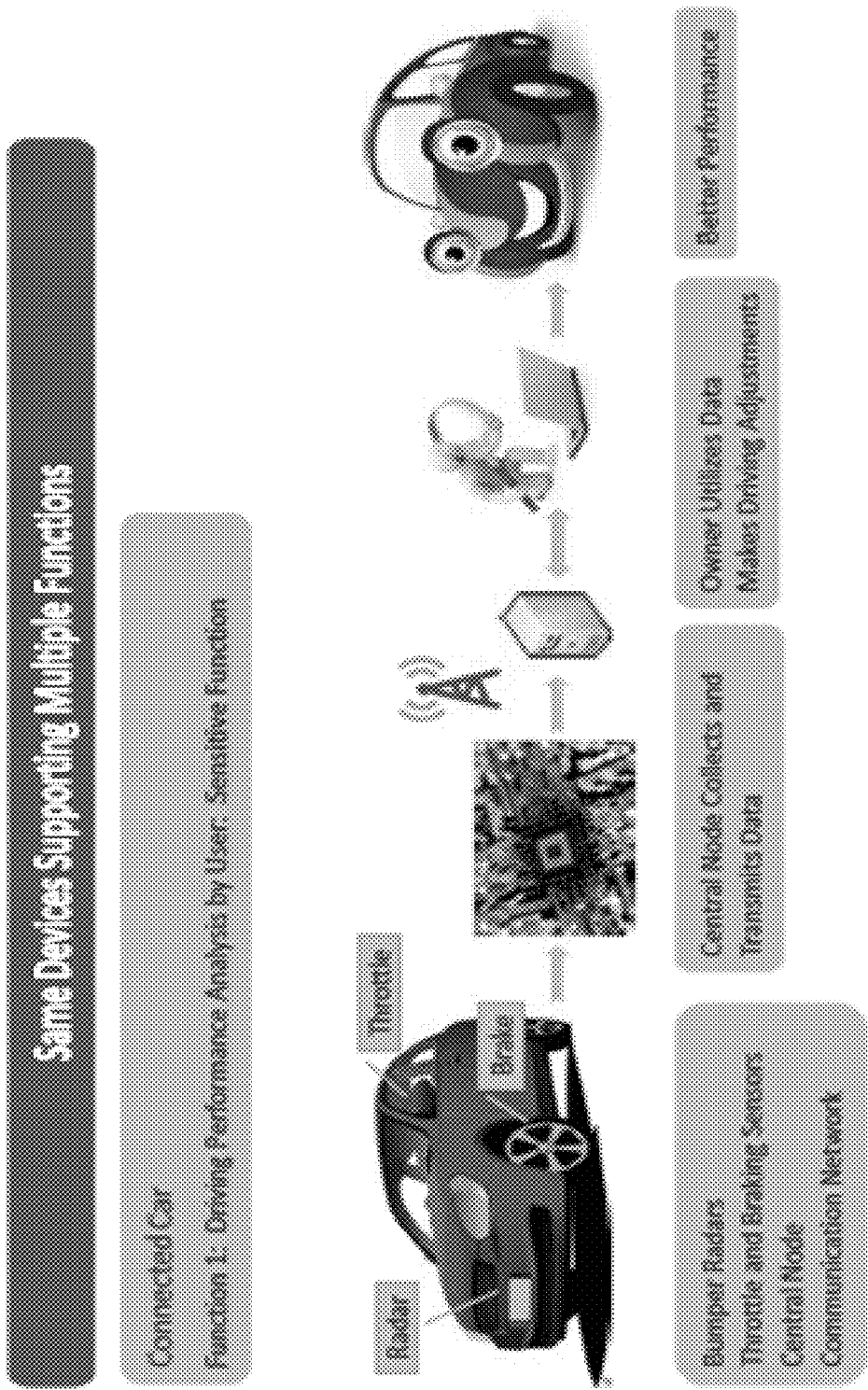
FIGS. 6-9 illustrate examples of diagrams detailing functions of devices performing in different environments and corresponding impacts of failure to perform device function in accordance with one or more embodiments described herein.
Figure 7:
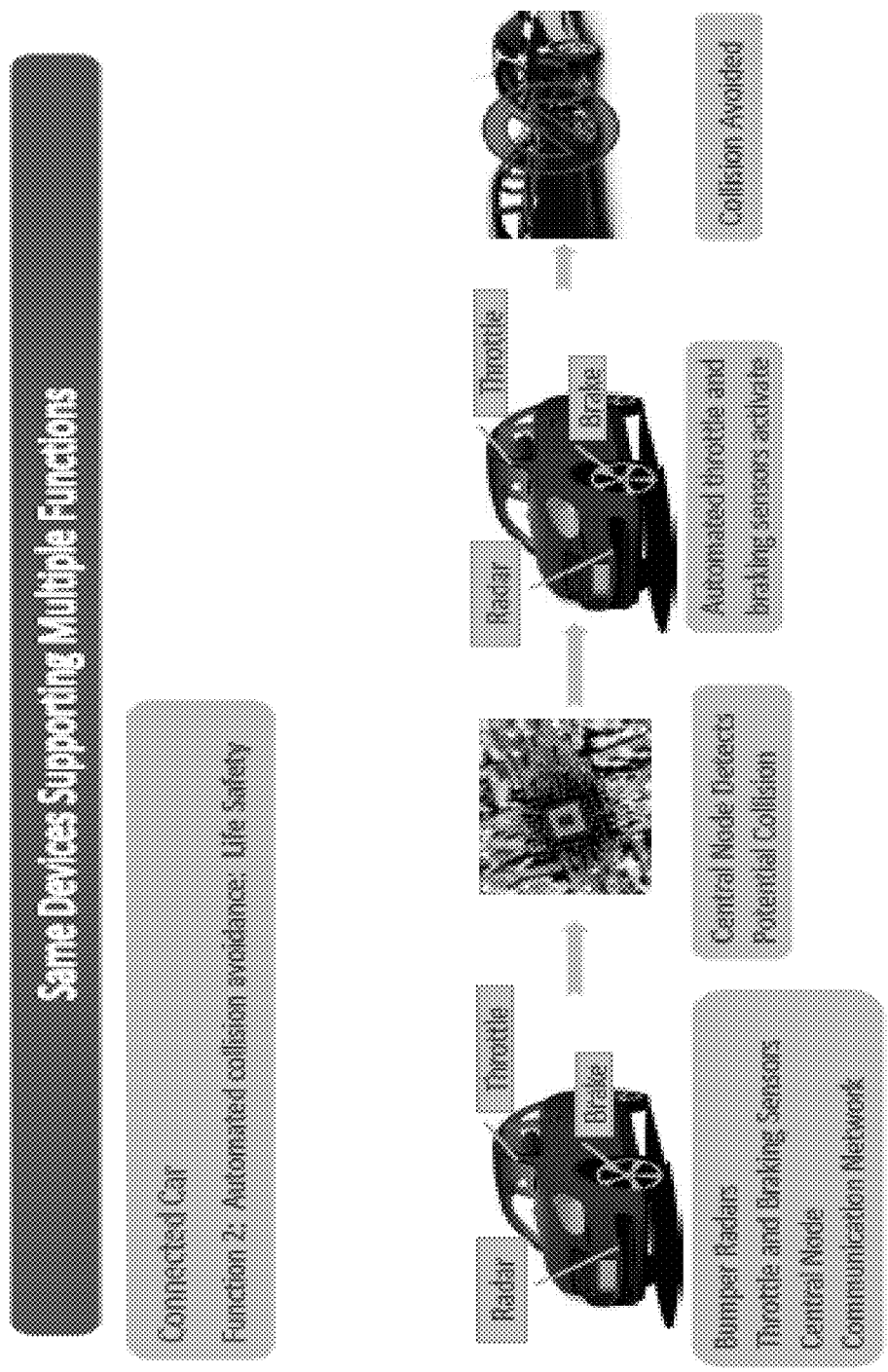

FIGS. 6-9 illustrate examples of diagrams detailing functions of devices performing in different environments and corresponding impacts of failure to perform device function in accordance with one or more embodiments described herein. In FIGS. 6 and 7, diagrams illustrate examples of the same device supporting different functions. For example, the function shown in FIG. 6 can be driving performance analysis by a user associated with the connected car. By contrast, the function shown in FIG. 7 can be automated collision avoidance. Accordingly, albeit the environment is the same (e.g., connected car environment), the potential impact of failure of the function, the business logic and the device data differ significantly as is described in further detail below with reference to FIGS. 6 and 7.

As shown in FIG. 6, driving performance analysis includes the functions of bumper radar, throttle and braking sensors, and transmitting such information from the sensors to a central node and communication network. Driving adjustments are then made and better performance can result. In this case, business logic, device data and potential impact of failure can result in classification by functional classification device 104 of a sensitive functional classification.

As shown in FIG. 7, automated collision avoidance includes the functions of bumper radar, throttle and braking sensors, and transmitting such information from the sensors to a central node and communication network. The information is then analyzed to determine a likelihood of collision and possible next steps for collision avoidance. The automated throttle and braking sensors can then activate to throttle or brake and collision can be avoided. In this case, business logic, device data and potential impact of failure can result in classification by functional classification device 104 of a life safety functional classification.

Figure 8:
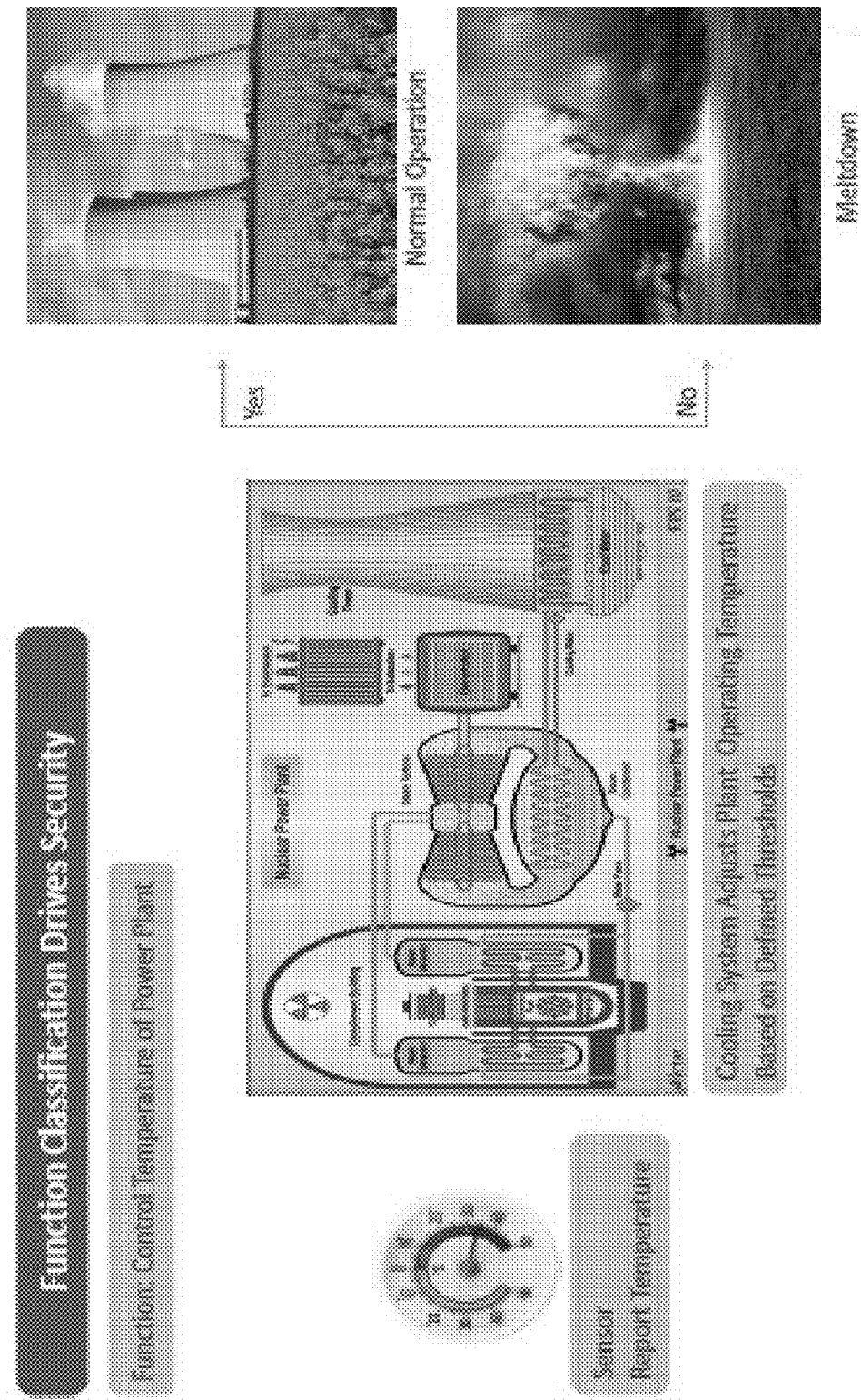
Figure 9:
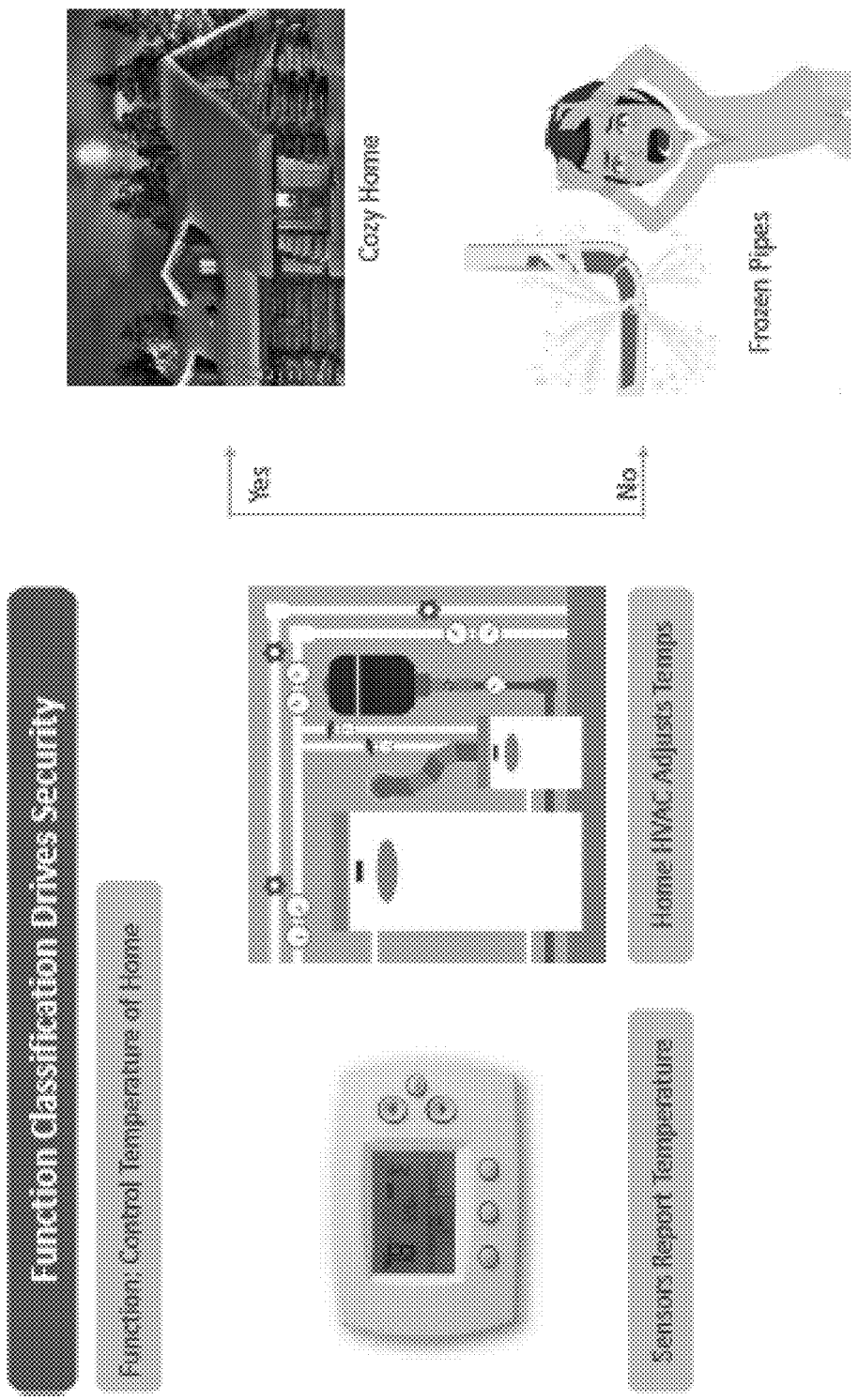

FIGS. 8 and 9 illustrate scenarios in which functional classifications can necessitate different security controls for the data generated by different devices. Turning first to FIG. 8, a sensor that senses and reports temperature in a power plant is shown. Based on the reported temperature, a cooling system adjusts plant operating temperature based on defined thresholds and determines whether plant operations are in the normal operation range or in the abnormal (e.g., meltdown) operation range. Because the potential failure of the sensor can result in life safety impact (e.g., meltdown without warning to those working or living near the plant), functional classification device 104 classifies the sensor device as having the life safety functional classification. Based on the life safety functional classification, security controls for the data generated by the sensor can be at the highest level such that the data generated by the sensor is protected from eavesdropping, manipulation and the like.

By contrast, shown in FIG. 9 is a sensor that controls the temperature of a home. Accordingly, the sensors in FIGS. 8 and 9 are both temperature sensors but the sensor in FIG. 8 monitors and senses the temperature of a power plant while the sensor in FIG. 9 monitors and senses the temperature of a home. As shown in FIG. 9, the sensor senses the temperature in a home and outputs data to the home heating ventilation air conditions (HVAC) system. The HVAC system adjusts the temperature in the home based on the data received and the temperature is either maintained in a normal range or the sensor can detect that the home is in an abnormal range. As such, in the case of failure for the sensor of FIG. 9, temperature is not controlled in the home. Frozen pipes can result, for example. Accordingly, since frozen pipes are not an impact to life safety, but can cause loss and/or damage to the home, the functional classification for such function is critical. Based on the critical functional classification, the data of the sensor can be protected at a level of security that is greater than that for a device having a non-sensitive or sensitive functional classification but at a level of security less than that for the device having the life safety functional classification of FIG. 8.

As such, to further illustrate the need for a functional classification, the temperature sensor in the home and nuclear power plant can be further elucidated. The device data can be the data output from the device. For example, for a temperature sensor, temperature sensor data can be the device data output that can be considered in determining the functional classification of the device. As another example, environmental control system commands for adjusting heating/cooling systems can be another example of device data output that can be considered in determining the functional classification of the device.

Putting aside the obvious differences between a home and nuclear power plant, the temperature data by itself is not adequate for determining the appropriate security controls. The business logic is also the same in both cases. For example, by way of example, but not limitation, the business logic can be, for example, the operations of the device. For example, the business logic can be that temperature sensors track and send readings to environmental control systems. Environmental controls systems are configured with safe operating parameters and adjust heating and cooling systems as needed.

Accordingly, the same device data and business logic is employed. However, the potential impact of failure differs significantly. Upon failure of the device, environment controls (e.g., heating and cooling) are not maintained.

As such, in the case associated with FIG. 9, frozen pipes and subsequent loss can result. The functional classification can therefore be critical for this case. By contrast, at a nuclear Power Plant, a potential nuclear meltdown could occur if the device fails. As such, the functional classification for the functionality shown in FIG. 8 will be life safety.

The above example is a basic use case and represents just a single function in two different networks/ecosystems. In other embodiments, M2M networks/devices can include multiple functions often times with differing functional classifications. These multiple functions will also potentially be supported by the same set of devices. The M2M functional classification framework and the supporting security design principles and requirements address these situations. In these instances, the security controls commensurate with the highest functional classification would be applied.

Turning back to FIG. 3, functional classification component 104 can also include memory 304, processor 306 and data storage 310. Memory 304 can be a computer-readable storage medium storing computer-executable instructions and/or information for performing the functions described herein with reference to functional classification component 104 (or a component of functional classification component 104). For example, memory 304 can store computer-executable instructions that can be executed by processor 306 to transmit and/or receive functional classification information for one or more devices (e.g., devices 106, 108, 110); receive and/or process logic information associated with the functions of devices 106, 108, 110; transmit and/or receive information indicative of the functional classification of functional classification component 104 or any number of other types of functions executed by functional classification component 104.

Processor 306 can process computer-readable storage medium computer-executable instructions to perform one or more of the functions described herein with reference to functional classification component 104 (or a component of functional classification component 104).

Data storage 308 can store information indicative of functional classification types available for assignment to devices and/or one or more criteria for assigning a particular functional classification. Data storage 308 can also store information indicative of one or more functional classifications for one or more devices.

Figure 10:
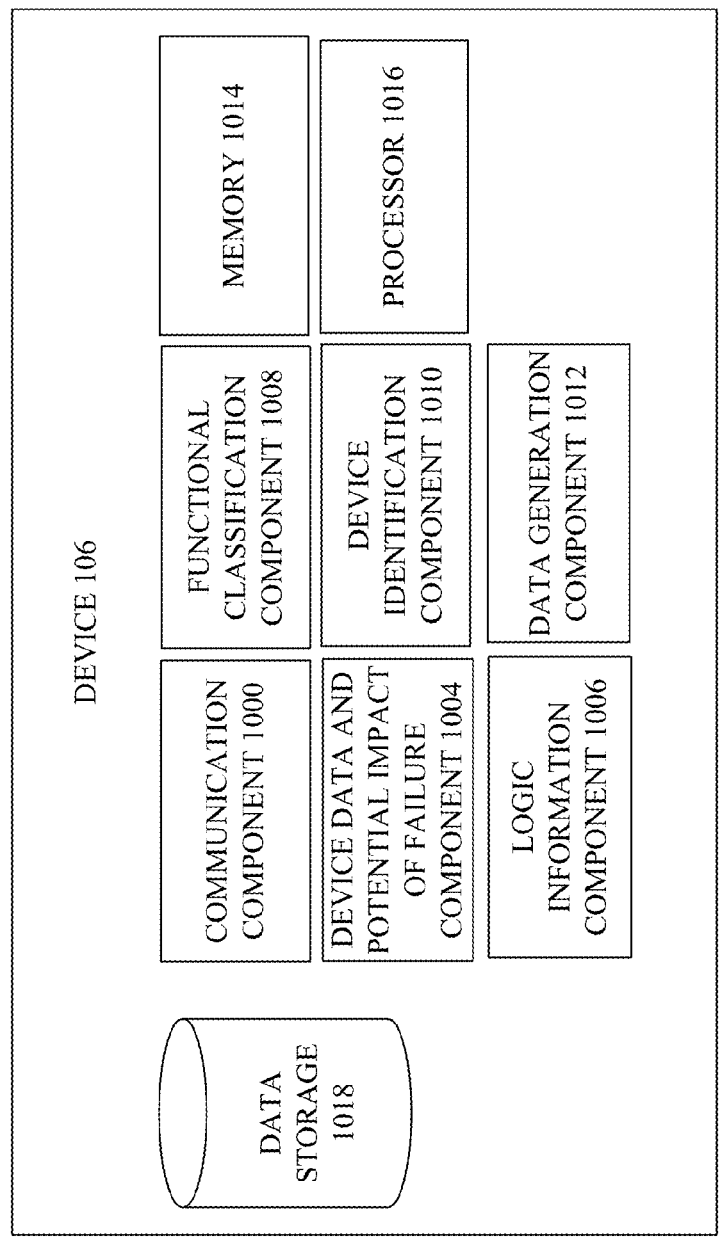
FIG. 10 illustrates an example block diagram of a device of FIG. 1 in an M2M network for which QoS and security can be facilitated via functional classification in accordance with one or more embodiments.
Figure 11:
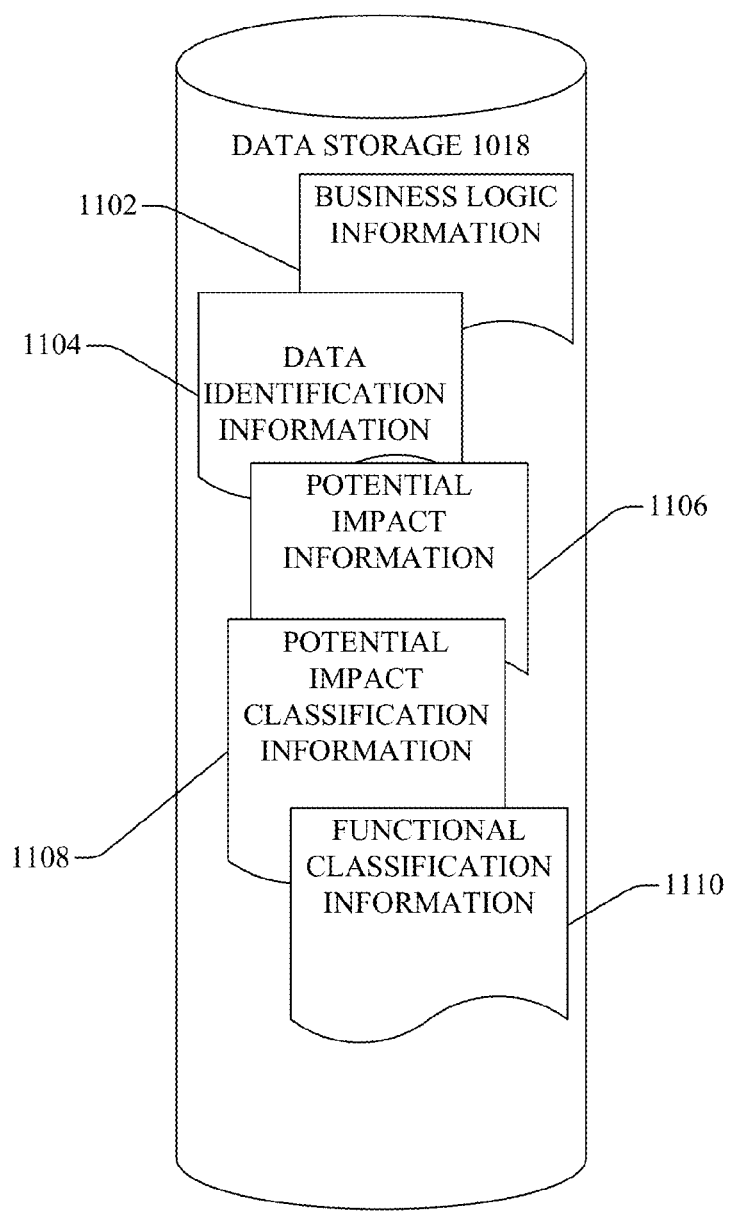
FIG. 11 illustrates an example block diagram of data storage of the device of FIG. 10 in accordance with one or more embodiments.

FIG. 10 illustrates an example block diagram of a device of FIG. 1 in an M2M network for which QoS and security can be facilitated via functional classification in accordance with one or more embodiments. FIG. 11 illustrates an example block diagram of data storage of the device of FIG. 10 in accordance with one or more embodiments. Repetitive description of like elements employed in other embodiments described herein is omitted for sake of brevity.

Device 106 can include communication component 1000, device data and potential impact of failure component 1004, logic information component 1006, functional classification component 1008, device identification component 1010, data generation component 1012, memory 1014, processor 1016 and/or data storage 1018. In various embodiments, communication component 1000, device data and potential impact of failure component 1004, logic information component 1006, functional classification component 1008, device identification component 1010, data generation component 1012, memory 1014, processor 1016 and/or data storage 1018 can be electrically and/or communicatively coupled to one another.

Communication component 1000 can receive and/or transmit information from and/or to device 106. By way of example, but not limitation, communication component 1000 can transmit information indicative of business logic, device data and/or potential impact of failure of the function of device 106 to functional classification device 104. Communication component 1000 can receive information indicative of a functional classification of device 106 assigned by functional classification device 104 in some embodiments. In some embodiments, communication component 1000 can transmit data generated by device 106. The data can be tagged or otherwise annotated based on an assigned security control and/or QoS control resultant from the functional classification of device 106.

In various embodiments, device 106 can have direct connectivity with an M2M network and/or connect to the M2M network by employing a gateway as a network proxy. In the first embodiment, device 106 can obtain direct connectivity to the M2M network via an access network. Device 106 can perform one or more procedures such as registration, authentication, authorization, management and/or provisioning with the network. In some embodiments, device 106 can provide service to other devices (e.g., legacy devices) connected to devices that are hidden from the M2M network.

In the second embodiment, device 106 can access the M2M network employing a gateway as a network proxy. For example, the gateway can be FCSQOSC device 102.

FCSQOSC device 102 can act as a proxy for the network for device 102. Examples of procedures that can be proxied include, but are not limited to, authentication, authorization, management, and/or provisioning. In this embodiment, an M2M area network can provide connectivity between device 106 and FCSQOSC device 102. Examples of M2M area networks include, but are not limited to, personal area network technologies such as IEEE 802.15.1 [i.3], Zigbee, Bluetooth, IETF ROLL, ISA100.11a, etc or local networks such as PLC, M-BUS, Wireless M-BUS and KNX.

With reference to FIG. 10, device data and potential impact of failure component 1004 can store, update and/or process information indicative of the type of data input and/or output to and/or from device 106. Device data and potential impact of failure component 1004 can also store, update and/or process information indicative of the potential impact of failure of device 106. For example, in some embodiments, the potential impact of failure can be preprogrammed in device 106. By way of example, but not limitation, potential impact of failure can include water damage if device 106 is a water sensor, or frozen pipes if device 106 is a temperature sensor.

Logic information component 1006 can store, update and/or process information indicative of the business logic of device 106. The business logic can include rules and/or instructions for operations of device 106. By way of example, but not limitation, business logic can include information regarding the manner of operation of device 106 in numerous different circumstances including, but not limited to, manner of operation based on inputs from other devices and/or manner of operation based on events sensed, detected, measured or otherwise known or determined by device 106.

Functional classification component 1008 can receive and/or store information from functional classification device 104 indicative of the functional classification assigned to device 104. Device identification component 1010 can include information indicative of the identity of device 106. Device identification component 1010 can include serial number, device identification number or any other information for identifying device 106.

Data generation component 1012 can generate data to be transmitted from device 106. By way of example, but not limitation, data generation component 1012 can generate data about information or events sensed, detected and/or measured by device 106.

Memory 1014 can be a computer-readable storage medium storing computer-executable instructions and/or information for performing the functions described herein with reference to device 106 (or a component of device 106). For example, memory 1014 can store computer-executable instructions that can be executed by processor 1016 to transmit and/or receive information about events sensed or detected or measured and/or transmit, receive and/or process information indicative of the function of device 106; logic information associated with the functions of device 106 or the like.

Processor 1016 can process computer-readable storage medium computer-executable instructions to perform one or more of the functions described herein with reference to device 106 (or a component of device 106).

FIG. 11 illustrates an example block diagram of data storage of the device of FIG. 10 in accordance with one or more embodiments. Repetitive description of like elements employed in other embodiments described herein is omitted for sake of brevity.

Data storage 1018 can be configured to store information accessed, received, processed and/or displayed by device 106 (or a component of device 106). For example, as shown in FIG. 11, data storage 1018 can store business logic information 1102 associated with the functions of device 106; data identification information 1104 including information identifying device 106; potential impact information 1106 including information such as whether a failure of device 106 will result in potential impact to life safety or some other impact to a physical environment in which device 106 is located or with which device 106 is associated; potential impact classification information 1108 including information indicative of a level of functional classification of device 106 based on the potential impact information 1106; functional classification information 1110 includes information indicative of the functional classification assigned to device 106 based on the function of device 106.

Figure 12:
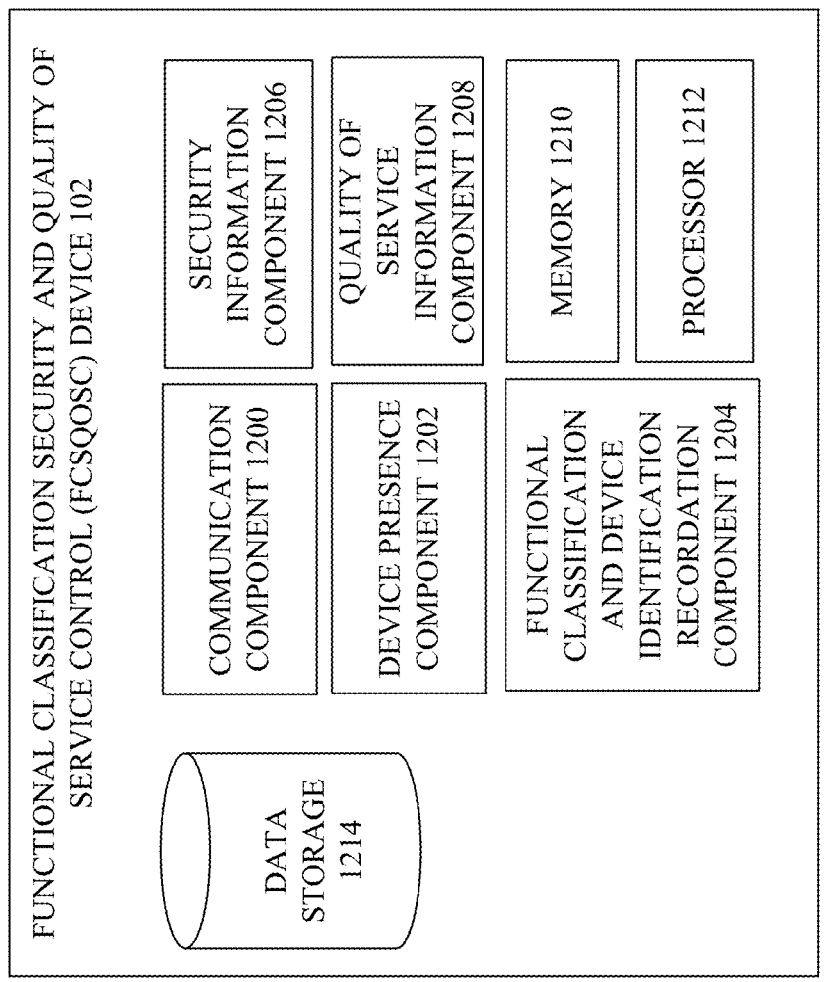
FIG. 12 illustrates an example block diagram of the functional classification security and quality of service control (FCSQOSC) device of FIG. 1 that can facilitate QoS and security via functional classification of devices in the M2M network of FIG. 1 in accordance with one or more embodiments.
Figure 13:
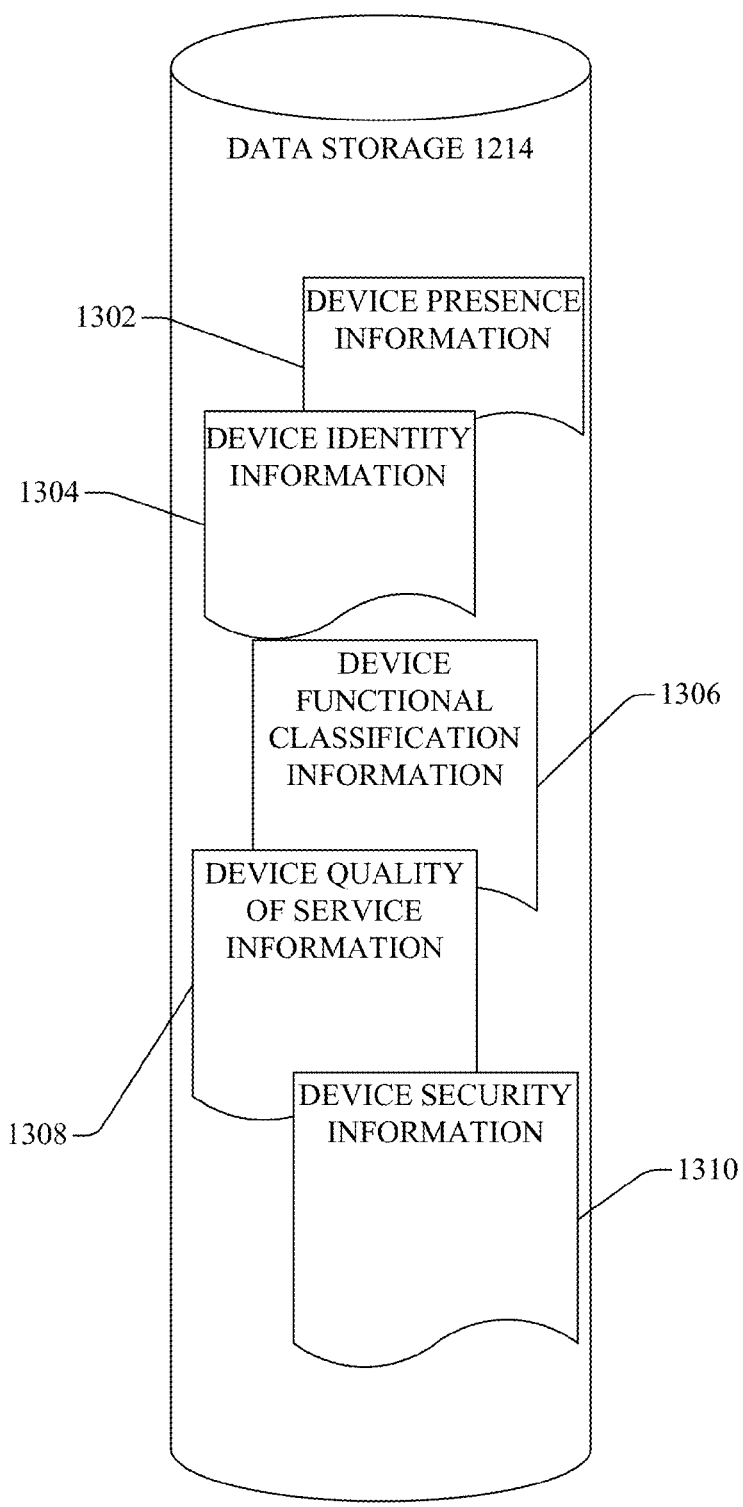
FIG. 13 illustrates an example block diagram of data storage of the FCSQOSC device of FIG. 12 in accordance with one or more embodiments.

An embodiment of FCSQOSC device 102 can be described in greater detail with reference to FIGS. 12 and 13. FIG. 12 illustrates an example block diagram of the functional classification security and quality of service control (FCSQOSC) device of FIG. 1 that can facilitate QoS and security via functional classification of devices in the M2M network of FIG. 1 in accordance with one or more embodiments. FIG. 13 illustrates an example block diagram of data storage of the FCSQOSC device of FIG. 12 in accordance with one or more embodiments. Repetitive description of like elements employed in other embodiments described herein is omitted for sake of brevity.

As shown, FCSQOSC device 102 can include communication component 1200, device presence component 1202, functional classification and device identification recordation component 1204, security information component 1206, QoS information component 1208, memory 1210, processor 1212 and/or data storage 1214. In various embodiments, one or more of communication component 1200, device presence component 1202, functional classification and device identification recordation component 1204, security information component 1206, QoS information component 1208, memory 1210, processor 1212 and/or data storage 1214 can be electrically and/or communicatively coupled to one another to perform one or more functions of FCSQOSC device 102.

With reference to FIGS. 1 and 12, communication component 1200 can transmit and/or receive information from and/or at FCSQOSC device 102. For example, in one embodiment, communication component 1200 can receive information indicative of the identity and/or functional classification assigned to a device (e.g., device 106) in or entering a network such as an M2M network with which FCSQOSC device 102 is associated. Communication component 1200 can transmit information indicative of the identity and/or functional classification of a device to controller device 114 to facilitate controller device 114 determining and/or applying security control and/or QoS control to the device. In some embodiments, FCSQOSC device 102 can transmit the security and/or QoS control information about the device to controller device 114.

Device presence component 1202 can process information indicating that a new device has entered the network. Functional classification and device identification recordation component 1204 can record/store information indicative of the identity and/or functional classification of a device. In some embodiments, functional classification and device identification recordation component 1204 can initiate storage of the information at a location remote from FCSQOSC device 102 that can be retrieved by FCSQOSC device 102 and/or controller device 114 over a network.

Security information component 1206 can generate information indicative of a security control (e.g., security protocol, manner of handling security for the data generated by a device) for a particular device. In some embodiments, security information component 1206 can transmit to controller device 114 one or more types of security information that controller device 114 can utilize to tag data from the device and/or establish or setup encryption or other manner of security protocols so that the device data is secured at desired level.

QoS information component 1208 can generate information indicative of a QoS control (e.g., QoS latency, throughput and/or reliability protocol, manner of handling QoS for the data generated by a device) for a particular device. In some embodiments, QoS information component 1208 can transmit to controller device 114 one or more types of QoS information that controller device 114 can utilize to tag data from the device and/or establish or setup QoS or other manner of QoS protocols so that the device data is secured at desired level.

Memory 1210 can be a computer-readable storage medium storing computer-executable instructions and/or information for performing the functions described herein with reference to FCSQOSC device 102 (or a component of FCSQOSC device 102). For example, memory 1210 can store computer-executable instructions that can be executed by processor 1212 to receive and/or process information indicative of the presence, identity and/or functional classification of a device in the network, transmit or initiate transmission of information to one or more controllers in the network about the functional classification of a device for QoS and/or security provisioning facilitating by the controller, generate information associated with security for data generated by the device, generate information associated with QoS for data generated by the device or any number of other types of functions executed by FCSQOSC device 102.

Processor 1212 can process computer-readable storage medium computer-executable instructions to perform one or more of the functions described herein with reference to FCSQOSC device 102 (or a component of FCSQOSC device 102).

FIG. 13 illustrates an example block diagram of data storage of the FCSQOSC device of FIG. 12 in accordance with one or more embodiments. Repetitive description of like elements employed in other embodiments described herein is omitted for sake of brevity.

Data storage 1214 can be configured to store information accessed, received, processed and/or displayed by FCSQOSC device 102 (or a component of FCSQOSC device 102). For example, as shown in FIG. 13, data storage 1214 can store: device presence information 1302 including information indicative of a time/day in which a device is present in the M2M network; device identity information 1304 including information indicative of an identity of a device in the network; device functional classification information 1306 including information indicative of a functional classification assigned to a particular device (in some embodiments, as reported by the device to FCSQOSC device 102); device QoS information 1308 including information regarding one or more aspects of QoS associated with a device (in some embodiments, derived or determined based on the functional classification of the device); and/or device security information 1310 including information regarding one or more aspects of security associated with a device (in some embodiments, derived or determined based on the functional classification of the device).

Figure 14:
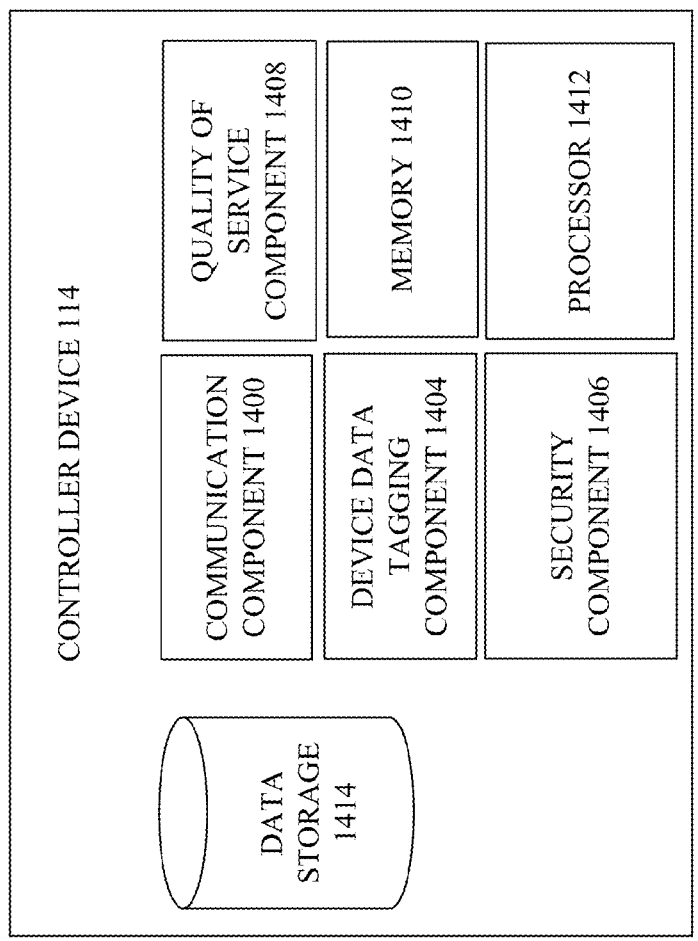
FIG. 14 illustrates an example block diagram of the controller device of FIG. 1 that can facilitate QoS and security via functional classification of devices in M2M networks in accordance with one or more embodiments.

FIG. 14 illustrates an example block diagram of the controller of FIG. 1 that can facilitate QoS and security via functional classification of devices in M2M networks in accordance with one or more embodiments. Repetitive description of like elements employed in other embodiments described herein is omitted for sake of brevity.

Controller device 114 can include communication component 1400, device data tagging component 1404, security component 1406, QoS component 1408, memory 1410, processor 1412 and/or data storage 1414. In various embodiments, communication component 1400, device data tagging component 1404, security component 1406, QoS component 1408, memory 1410, processor 1412 and/or data storage 1414 can be electrically and/or communicatively coupled to one another to perform one or more functions of controller device 114.

Communication component 1400 can receive information indicative of the identity and/or functional classification of a device. Communication component 1400 can transmit and/or receive information indicative of the security control and/or QoS control for the data for a particular device. For example, in one embodiment, communication component 1400 can receive, from FCSQOSC device 102, information indicative of the security control and/or QoS control for data for a particular device. As another example, communication component 1400 can transmit security control and/or QoS control information to one or more other components of the M2M network so that such components will apply an appropriate level of security and/or QoS to the data for the device.

Device data tagging component 1404 can generate one or more different tags to describe the security and/or QoS with which device data should be processed. The tag can be applied to the data and forwarded along with data through the M2M network so as to inform other network components of the manner of handling the data.

Security component 1406 can generate information assigning a security protocol or security control information to a particular device. QoS component 1408 can generate information assigning a QoS protocol or QoS control information to a particular device.

Accordingly, controller device 114 can automatically configure downstream switches to perform certain levels of QoS with respect to information from certain devices with particular functional classification and/or treat certain information as having different levels of security. As such, FCSQOSC device 102 notification of controller device 114 can cause controller device 114 to notify the SDN to apply a certain QoS for the data generated from a particular device. An example of applying a particular level of QoS could be to tag the information with the functional classification information and then treat accordingly.

Memory 1410 can be a computer-readable storage medium storing computer-executable instructions and/or information for performing the functions described herein with reference to controller device 114. For example, functions can include assignment of security and/or QoS protocols to a device or device data.

Processor 1412 can process computer-readable storage medium computer-executable instructions to perform one or more of the functions described herein with reference to controller device 114 (or a component of controller device 114).

Data storage 1414 can store information indicative of security protocols and/or QoS protocols available in the network and/or information for tagging one or more different devices with one or more different security and/or QoS tags.

Figure 15:
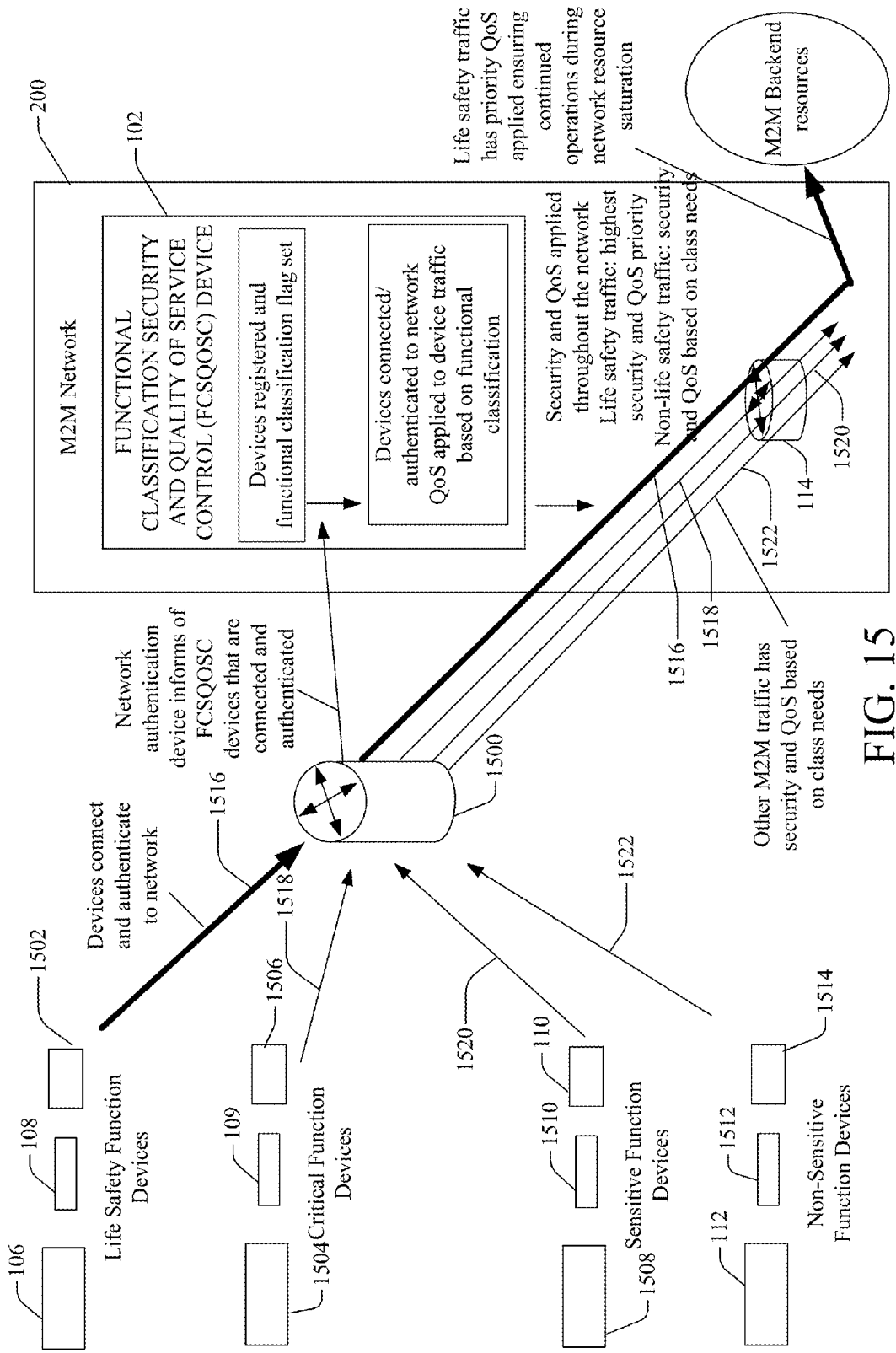
FIG. 15 illustrates an example schematic diagram of the provisioning of security and QoS in the M2M network of FIG. 1 in accordance with one or more embodiments described herein.

FIG. 15 illustrates an example schematic diagram of the provisioning of security and QoS in the M2M network of FIG. 1 in accordance with one or more embodiments described herein. Repetitive description of like elements employed in other embodiments described herein is omitted for sake of brevity.

As shown, devices connect to and/or authenticate with a network device (e.g., network device 1500). In some embodiments, network connection/authentication device 1500 can be included as a part of FCSQOSC device 102. As shown, in some embodiments, the same type of device can have two different functional classifications. For example, devices 106 and 1504 are the same device but device 106 is classified with the life safety functional classification while device 1504 is classified with the critical functional classification. The devices shown in FIG. 15 have been classified by a functional classification device such as functional classification device 104 of FIG. 3.

Upon entering M2M network 200, devices 106, 108, 109, 110, 112, 1502, 1504, 1506, 1508, 1510, 1512, 1514 register with FCSQOSC device 102. During or before or after registration at M2M network 200, devices 106, 108, 109, 110, 112, 1502, 1504, 1506, 1508, 1510, 1512, 1514 transmit to FCSQOSC device 102 information indicative of the identity of the respective device and the assigned functional classification of the respective device. FCSQOSC device 102 can be the control center for security and QoS and/or can be responsible for dynamically assigning security and QoS controls throughout M2M network 200 based on the device and the assigned functional classification of the device. In some embodiments, FCSQOSC device 102 can store information indicative of the identity and the functional classification of a particular device registered with FCSQOSC device 102.

As one or more of devices 106, 108, 109, 110, 112, 1502, 1504, 1506, 1508, 1510, 1512, 1514 connect and are authenticated for entry to the network, network connection/authentication device 1500 can notify FCSQOSC device 102 that the device is connected and/or authenticated. Devices 106, 108, 109, 110, 112, 1502, 1504, 1506, 1508, 1510, 1512, 1514 can be registered with FCSQOSC device 102 and a flag can be set indicating the functional classification for the device in some embodiments. In other embodiments, any number of different type of information can be stored in or accessed by FCSQOSC device 102 regarding the type of functional classification associated with a particular device. In one embodiment, FCSQOSC device 102 can notify one or more different network orchestration tools (e.g., controller device 114) of the identity and functional classification of the devices registered with FCSQOSC device 102.

In one embodiment, FCSQOSC device 102 can determine security control information and/or QoS control information for the manner in which controller device 114 should handle the data generated by the device, based on the functional classification of the device. Data 1516 can be generated by devices having a life safety functional classification, data 1518 can be generated by devices having a critical functional classification, data 1520 can be generated by devices having a sensitive functional classification and data 1522 can be generated by devices having a non-sensitive functional classification.

Controller device 114 can then apply security controls and/or QoS controls to the data generated by the device based on the functional classification of the device. As such, data 1516, 1518, 1520, 1522 can be handled according to the respective security controls and/or QoS controls for the particular functional classification. In some embodiments, controller device 114 tags the data generated by the device with a tag indicating the functional classification and/or security controls and/or QoS controls for the device so that devices that process the data are aware of the manner in which the data from the device should be handled.

In other embodiments, controller device 114 receives and/or accesses identity and functional classification information and generates the security control and/or QoS control information for the particular device. Data 1516, 1518, 1520, 1522 is then processed in the manner dictated by the security and/or QoS control information for the functional classification to which the data belongs. In some embodiments, as shown, M2M backend resources can be dedicated to particular data to further provide QoS and/or security controls associated with the functional classification for the data.

Figure 16:
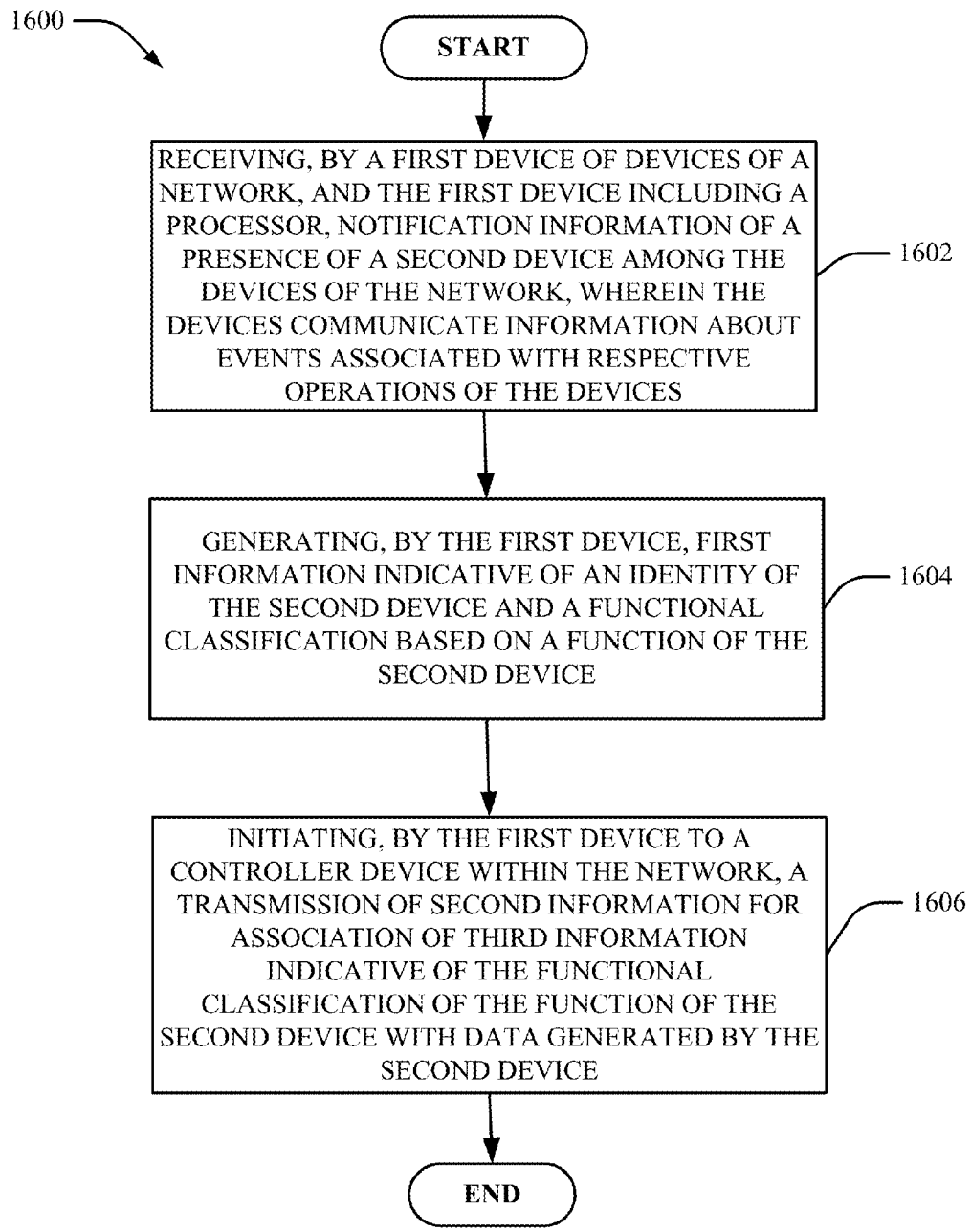
FIGS. 16-20 illustrate example flowcharts of methods that facilitate QoS and security via functional classification of devices in M2M networks in accordance with one or more embodiments.

FIGS. 16-20 illustrate example flowcharts of methods that facilitate QoS and security via functional classification of devices in M2M networks in accordance with one or more embodiments. Turning first to FIG. 16, at 1602, method 1600 can include receiving, by a first device (e.g., a FCSQOSC device) of devices of a network and including a processor, notification information of a presence of a second device among the devices within the network, wherein the devices are configured to communicate information about events associated with respective operations of the devices. The network can be an M2M network in various embodiments. For example, FCSQOSC device 102 can receive notification via wireless or wired communication channel informing FCSQOSC device 102 that a device (e.g., one or more of devices 106, 108, 109, 110, 112) is connected to and, in some embodiments, authenticated with) the network. The notification can be received from the device itself and/or from an authentication device (not shown) with which the device authenticates or any number of other devices that can determine that a device is connected to or authenticated with the network.

At 1604, method 1600 can include generating, by the first device, first information indicative of an identity of the second device and a functional classification based on a function of the second device. For example, in some embodiments, the first device can receive the identity of the new device and the functional classification of the new device and generate information indicative of the identity and/or functional classification. The information can be stored at FCSQOSC device 102 and/or at a location that can be accessed by FCSQOSC device 102 over a network to which FCSQOSC device 102 is communicatively coupled.

The functional classification of the function can be associated with a level of criticality of failure of the second device to the physical environment in which the second device is located. For example, if failure of the second device to perform a function results in loss of property, the device can be assigned the critical functional classification. By contrast, if the failure of the second device has no impact on the physical world in the region in which the second device is located, the device can be assigned the non-sensitive functional classification.

At 1606, method 1600 can include initiating, by the first device to a controller device within the network, a transmission of second information for association of third information indicative of the functional classification of the function of the second device with data generated by the second device. For example, FCSQOSC device 102 can initiate transmission of information that details the identity of a particular device and the functional classification of the device. In some embodiments, the controller device receives the information and determines the security and/or QoS for data generated by the device. In other embodiments, the FCSQOSC device 102 decides the security and/or QoS for the data generated by the device and transmits such information to the controller device.

In some embodiments, the third information is associated with a defined QoS for the data generated by the second device. In some embodiments, the third information can be further associated with a defined level of security accorded to the data generated by the second device. By way of example, but not limitation, the data generated by the device can be tagged or otherwise associated with the third information so as to improve the likelihood that a controller device or other device further downstream from the controller device will handle the data with the appropriate security and/or QoS.

Figure 17:
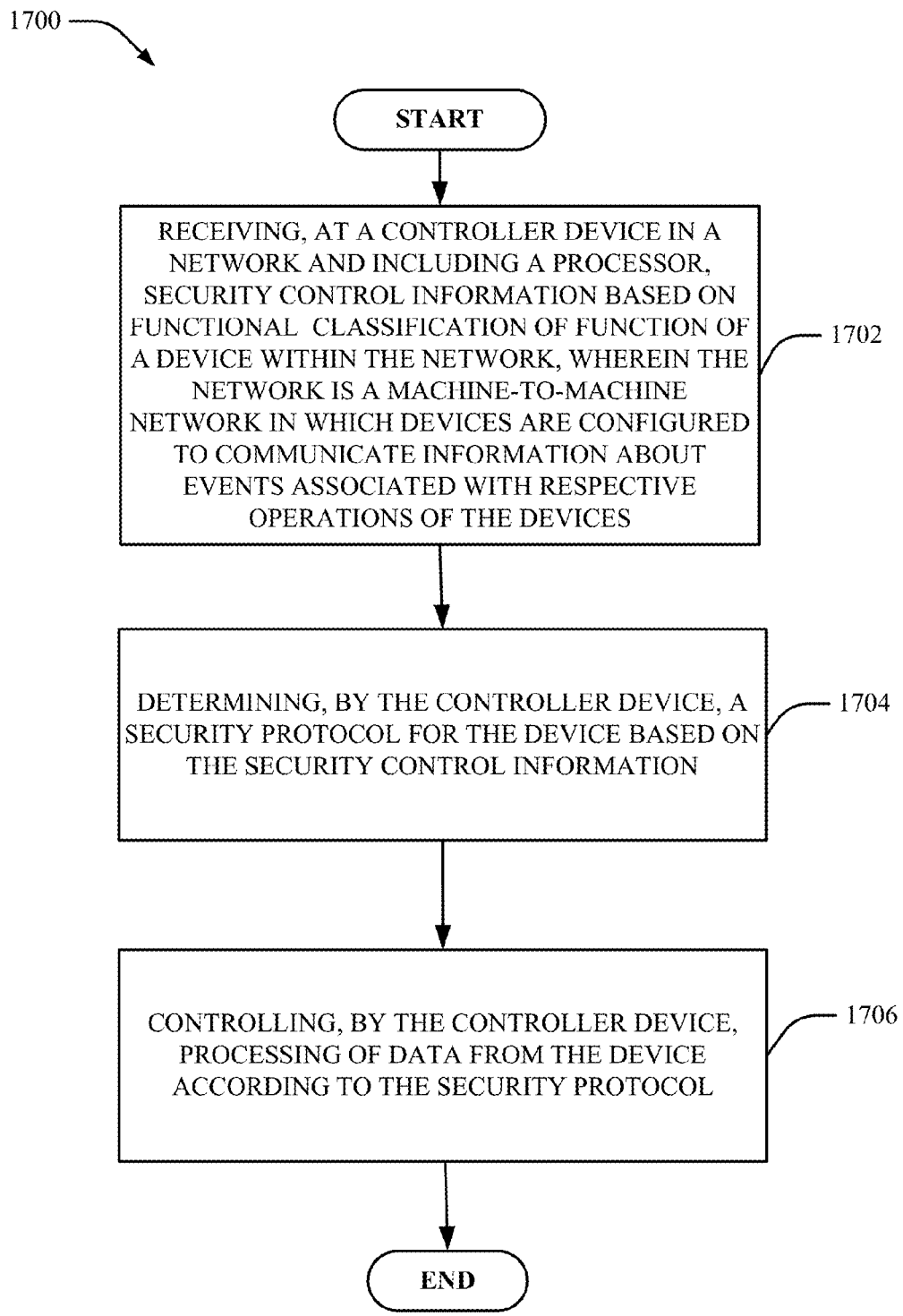

Turning now to FIG. 17, at 1702, method 1700 can include receiving, at a controller device in a network and including a processor, security control information based on functional classification of function of a device within the network, wherein the network is an M2M network in which devices are configured to communicate information about events associated with respective operations of the devices. For example, the controller device can receive from the FCSQOSC device 102 security control information indicative of a security protocol and/or a level of security to employ for data generated by a particular device. The security control information can be based on the functional classification of the device with the more extreme the impact of failure of the function the more security allotted to the device. By way of example, but not limitation, if a device has a life safety functional classification, the security control information can include encryption of information generated by the device. By contrast, if the device has a functional classification that is less severe than life safety (e.g., critical, non-sensitive or sensitive), the security control information can indicate no encryption to be applied to the data of the device.

At 1704, method 1700 can include determining, by the controller device, a security protocol for the device based on the security control information. In this embodiment, the controller device determines the security protocol after receiving security protocol information from FCSQOSC device 102.

At 1706, method 1700 can include controlling, by the controller device, processing of data from the device according to the security protocol. For example, the controller device can process the data differently depending on the security protocol associated with the data.

Figure 18:
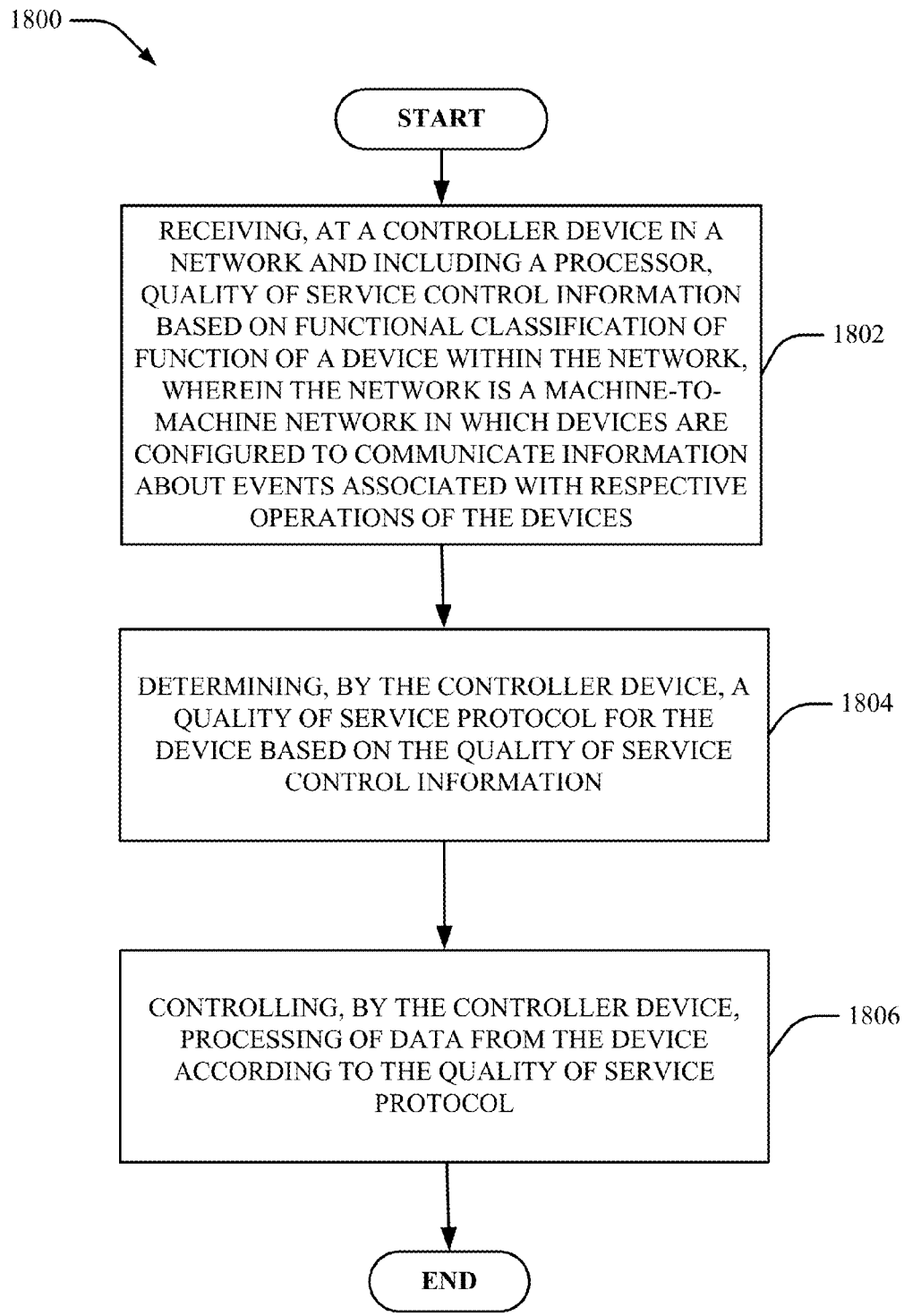

Turning now to FIG. 18, at 1802, method 1800 can include receiving, at a controller device in a network and including a processor, QoS control information based on functional classification of function of a device within the network, wherein the network is an M2M network in which devices are configured to communicate information about events associated with respective operations of the devices. The QoS control information can be employed to indicate desired throughput, maximum desired latency and/or desired reliability (e.g., maximum bit error rate) for the data generated by the device.

At 1804, method 1800 can include determining, by the controller device, a QoS protocol for the device based on the QoS control information. At 1806, method 1800 can include controlling, by the controller device, processing of data from the device according to the quality of service protocol.

Figure 19:
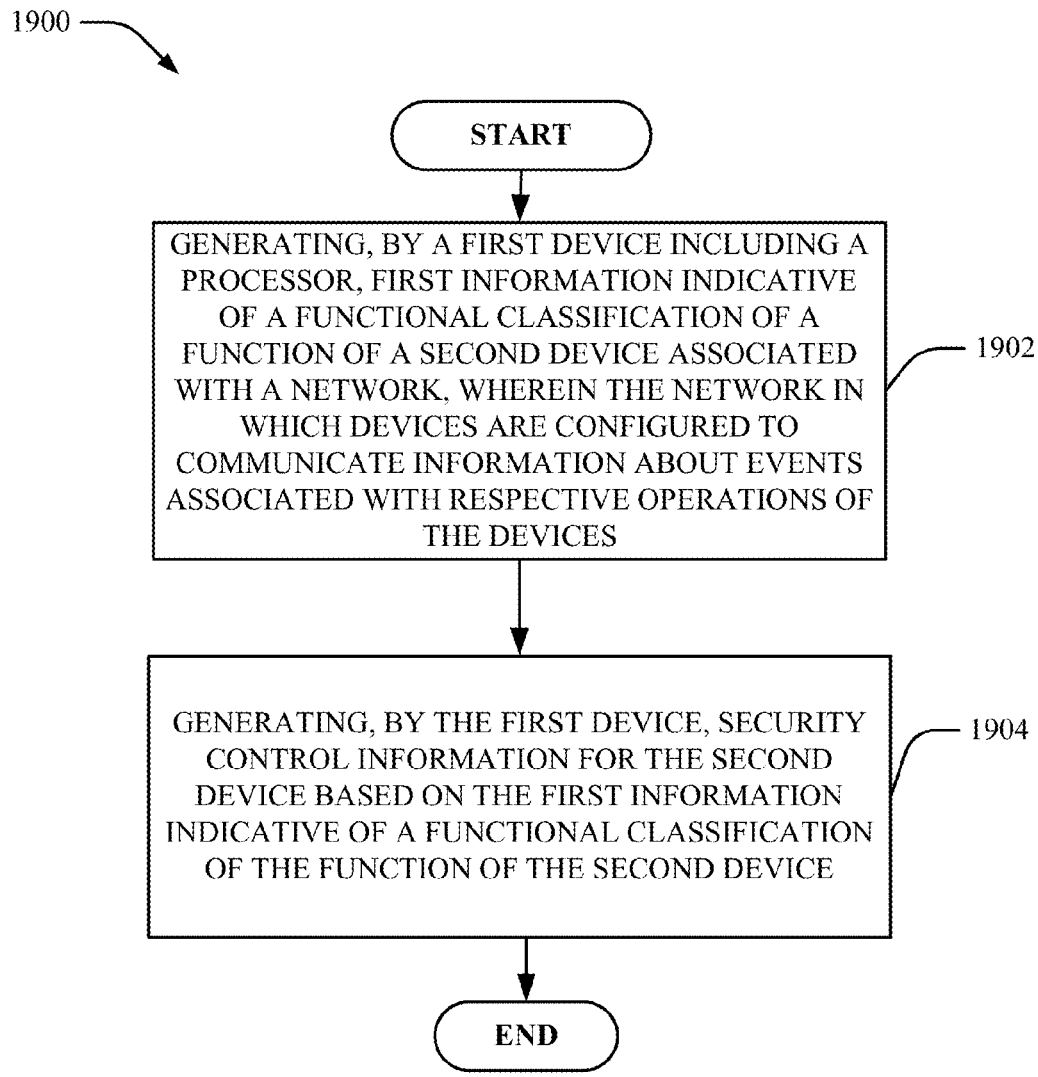

Turning now to FIG. 19, at 1902, method 1900 can include generating, by a first device including a processor, first information indicative of a functional classification of a function of a second device associated with a network, wherein the network in which devices are configured to communicate information about events associated with respective operations of the devices. At 1904, method 1900 can include generating, by the first device, security control information for the second device based on the first information indicative of a functional classification of the function of the second device.

Figure 20:
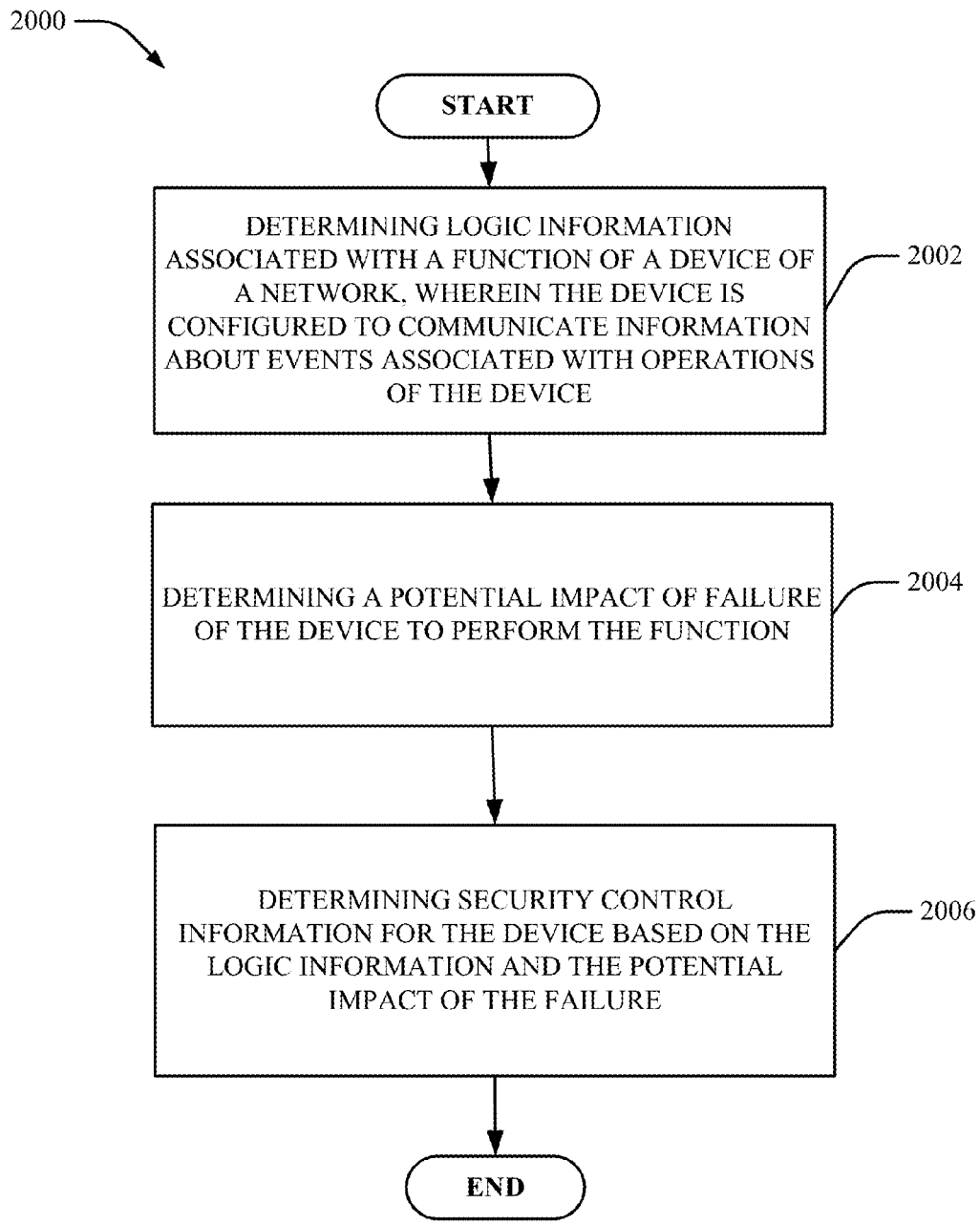

Turning now to FIG. 20, at 2002, method 2000 can include determining logic information associated with a function of a device of a network, wherein the devices are configured to communicate information about events associated with operations of the device. The device can be any number of different types of devices that can be communicatively coupled within an M2M network including, but not limited to, a connected car device, a device within a digital home network, a healthcare device, a smart grid, any of a number of different types of sensors (e.g., temperature or water sensor) or the like.

In some embodiments, the functions include a first function for which the potential impact of failure of the device to perform the function is a first level and a second function for which the potential impact of failure of the device to perform the function is a second level. In this embodiment, the first level has a greater level of criticality than the second level, and the security control information comprises determination of first security control information associated with the first function and determination of second security control information associated with the second function. By way of example, but not limitation, the first security control information can be associated with a higher level of security than a level of security for the second security control information.

At 2004, method 2000 can include determining a potential impact of failure of the device to perform the function. While not shown in method 2000, in some embodiments, method 2000 can also include determining data associated with the device, wherein the determining the security control information is further based on the data.

At 2006, method 2000 can include determining security control information for the device based on the logic information and the potential impact of the failure. In some embodiments, the potential impact includes physical impact in an environment in which the device is located. For example, the potential impact can be loss (e.g., property or financial loss) in an environment in which the device is located. As another example, the potential impact can be impact to personal or public safety in an environment in which the device is located. The security control information can include information detailing how to handle the security of the data generated by the device.

Figure 21:
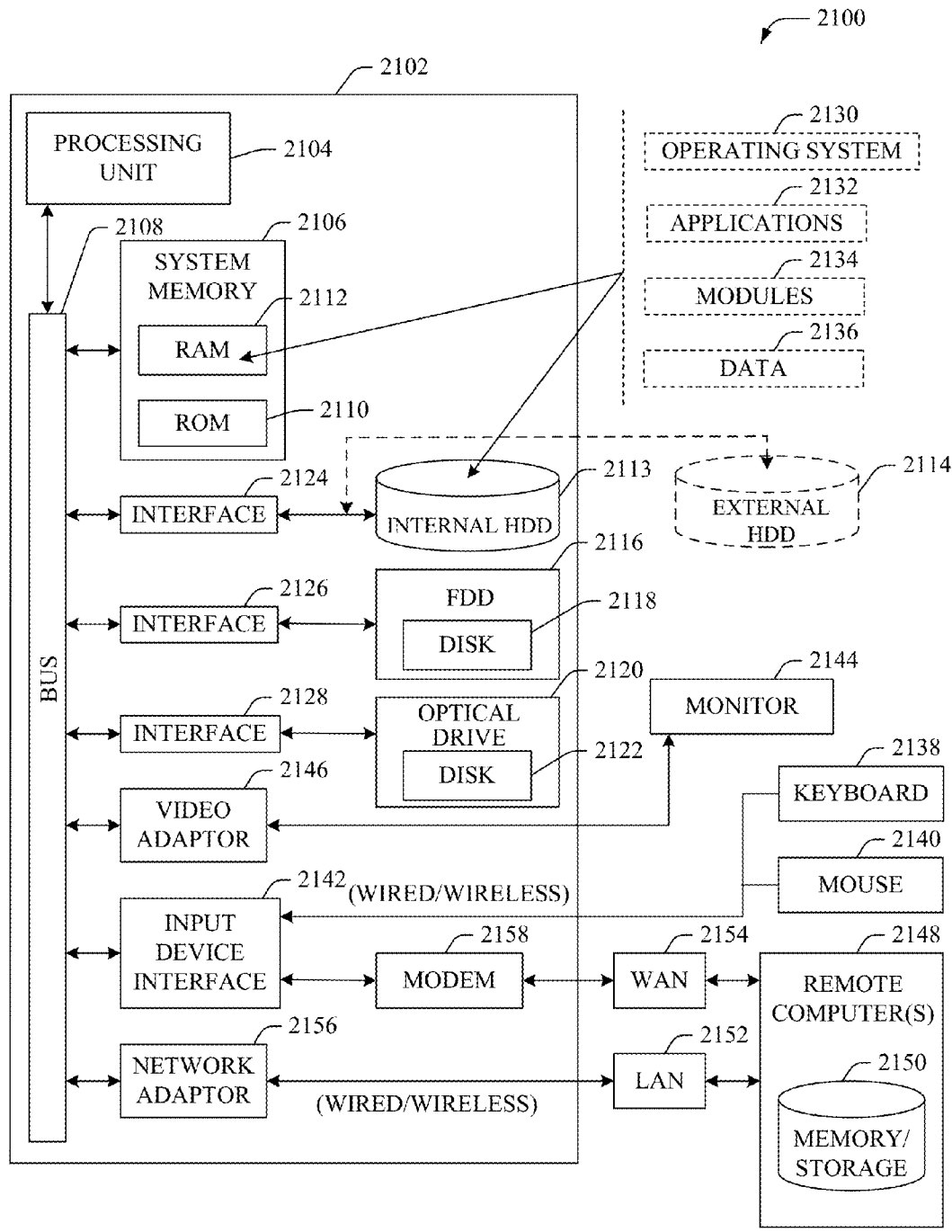
FIG. 21 illustrates a block diagram of a computer operable to facilitate QoS and security via functional classification of devices in M2M networks in accordance with one or more embodiments.

FIG. 21 illustrates a block diagram of a computer operable to facilitate QoS and security via functional classification of devices in M2M networks in accordance with one or more embodiments. For example, in some embodiments, the computer can be or be included within any number of components described herein including, but not limited to, FCSQOSC device 102 (or any components thereof), controller device 114 (or any components thereof) and/or devices 106, 108, 109, 110, 112 (or any components thereof).

In order to provide additional context for various embodiments described herein, FIG. 21 and the following discussion are intended to provide a brief, general description of a suitable computing environment 2100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 21, the example environment 2100 for implementing various embodiments of the embodiments described herein includes a computer 2102, the computer 2102 including a processing unit 2104, a system memory 2106 and a system bus 2108. The system bus 2108 couples system components including, but not limited to, the system memory 2106 to the processing unit 2104. The processing unit 2104 can be any of various commercially available processors. Dual microprocessors and other multi-processor architectures can also be employed as the processing unit 2104.

The system bus 2108 can be any of several types of bus structure that can further interconnect to a memory bus (with or without a memory controller), a peripheral bus, and a local bus using any of a variety of commercially available bus architectures. The system memory 2106 includes ROM 2110 and RAM 2112. A basic input/output system (BIOS) can be stored in a non-volatile memory such as ROM, erasable programmable read only memory (EPROM), EEPROM, which BIOS contains the basic routines that help to transfer information between elements within the computer 2102, such as during startup. The RAM 2112 can also include a high-speed RAM such as static RAM for caching data.

The computer 2102 further includes an internal hard disk drive (HDD) 2113 (e.g., EIDE, SATA), which internal hard disk drive 2113 can also be configured for external use in a suitable chassis (not shown), a magnetic floppy disk drive (FDD) 2116, (e.g., to read from or write to a removable diskette 2118) and an optical disk drive 2120, (e.g., reading a CD-ROM disk 2122 or, to read from or write to other high capacity optical media such as the DVD). The hard disk drive 2114, magnetic disk drive 2116 and optical disk drive 2120 can be connected to the system bus 2108 by a hard disk drive interface 2124, a magnetic disk drive interface 2126 and an optical drive interface, respectively. The interface 2124 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2102, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 2112, including an operating system 2130, one or more application programs 2132, other program modules 2134 and program data 2136. All or portions of the operating system, applications, modules, and/or data can also be cached in the RAM 2112. The systems and methods described herein can be implemented utilizing various commercially available operating systems or combinations of operating systems.

A mobile device can enter commands and information into the computer 2102 through one or more wired/wireless input devices, e.g., a keyboard 2138 and a pointing device, such as a mouse 2140. Other input devices (not shown) can include a microphone, an infrared (IR) remote control, a joystick, a game pad, a stylus pen, touch screen or the like. These and other input devices are often connected to the processing unit 2104 through an input device interface 2142 that can be coupled to the system bus 2108, but can be connected by other interfaces, such as a parallel port, an IEEE 1394 serial port, a game port, a universal serial bus (USB) port, an IR interface, etc.

A monitor 2144 or other type of display device can be also connected to the system bus 2108 via an interface, such as a video adapter 2146. In addition to the monitor 2144, a computer typically includes other peripheral output devices (not shown), such as speakers, printers, etc.

The computer 2102 can operate in a networked environment using logical connections via wired and/or wireless communications to one or more remote computers, such as a remote computer(s) 2148. The remote computer(s) 2148 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2150 is illustrated. The logical connections depicted include wired/wireless connectivity to a local area network (LAN) 2152 and/or larger networks, e.g., a wide area network (WAN) 2154. Such LAN and WAN networking environments are commonplace in offices and companies, and facilitate enterprise-wide computer networks, such as intranets, all of which can connect to a global communications network, e.g., the Internet.

When used in a LAN networking environment, the computer 2102 can be connected to the local network 2152 through a wired and/or wireless communication network interface or adapter 2156. The adapter 2156 can facilitate wired or wireless communication to the LAN 2152, which can also include a wireless AP disposed thereon for communicating with the wireless adapter 2156.

When used in a WAN networking environment, the computer 2102 can include a modem 2158 or can be connected to a communications server on the WAN 2154 or has other means for establishing communications over the WAN 2154, such as by way of the Internet. The modem 2158, which can be internal or external and a wired or wireless device, can be connected to the system bus 2108 via the input device interface 2142. In a networked environment, program modules depicted relative to the computer 2102 or portions thereof, can be stored in the remote memory/storage device 2150. It will be appreciated that the network connections shown are example and other means of establishing a communications link between the computers can be used.

The computer 2102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components including the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to include, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   generating, by a first device of devices of a network, first information indicative of an identity of a second device of the devices and a functional classification based on a function of the second device; and
   initiating, by the first device, a transmission of second information for association of third information with fourth information generated by the second device, wherein the third information is indicative of the functional classification of the function of the second device.

2. The method of claim 1, wherein the third information is associated with a level of quality of service for the fourth information generated by the second device.

3. The method of claim 2, wherein the level of quality of service for the fourth information comprises a maximum bit error rate for the fourth information.

4. The method of claim 2, wherein the fourth information generated by the second device is annotated with the third information by a controller device.

5. The method of claim 1, wherein the functional classification is further based on a potential impact of failure of the second device to perform the function of the second device.

6. The method of claim 5, wherein the potential impact is related to safety in an environment monitored by the second device.

7. The method of claim 5, wherein the potential impact is related to safety in a physical environment in which the second device is located.

8. The method of claim 1, wherein the functional classification is located on a spectrum of functional classifications that ranges from a non-sensitive designation to a life safety designation, and wherein the non-sensitive designation is provided a lowest level of quality of service of a group of levels of quality of service and the life safety designation is provided a highest level of quality of service of the group of the levels of quality of service.

9. The method of claim 1, wherein the functional classification is located on a spectrum of functional classifications that ranges from a non-sensitive designation to a life safety designation, and wherein the non-sensitive designation is provided a lowest level of security of a group of levels of security and the life safety designation is provided a highest level of security of the group of the levels of security.

10. An apparatus, comprising:
    a processor; and
    a memory that stores executable instructions that, when executed by the processor, facilitate performance of operations, comprising:
      determining logic information associated with a function of functions of a connected car device of a network, wherein the connected car device is configured to communicate information about events associated with operations of the connected car device;
      determining a potential impact of failure of the connected car device to perform the function; and
      determining security control information for the connected car device based on the logic information and the potential impact of the failure.

11. The apparatus of claim 10, wherein the functions comprise a first function for which the potential impact of the failure is associated with a first level of criticality and a second function for which the potential impact of the failure is associated with a second level of criticality, and wherein the determining of the security control information comprises determining first security control information associated with the first function and determining second security control information associated with the second function.

12. The apparatus of claim 11, wherein the first security control information is associated with a higher level of security than a level of security for the second security control information.

13. The apparatus of claim 10, wherein the logic information is first logic information, and wherein the determining the security control information comprises determining a first type of encryption for fourth information generated by the connected car device based on the first logic information and the potential impact of the failure.

14. The apparatus of claim 13, wherein the potential impact of the failure is a first potential impact of the failure, and wherein the operations further comprise determining a second type of encryption for the fourth information generated by the connected car device based on second logic information and a second potential impact of the failure.

15. The apparatus of claim 10, wherein the potential impact of the failure comprises a potential loss of life in an environment for which the function is performed by the connected car device.

16. The apparatus of claim 10, wherein the potential impact of the failure comprises a potential change in safety in an environment for which the connected car device performs the function.

17. A first device, comprising:
    a processor; and
    a memory that stores executable instructions that, when executed by the processor, facilitate performance of operations, comprising:
      generating first information indicative of a functional classification based on a function of a second device; and
      initiating a transmission of second information for association of third information with fourth information generated by the second device, wherein the third information is indicative of the functional classification.

18. The first device of claim 17, wherein the functional classification is associated with a level of criticality of failure of the second device to perform the function.

19. The first device of claim 17, wherein the second device is configured to initiate a healthcare treatment.

20. The first device of claim 17, wherein the second device is configured to initiate a fire safety operation.

* * * * *